(12) United States Patent
Shao et al.

(10) Patent No.: US 12,435,842 B2
(45) Date of Patent: Oct. 7, 2025

(54) METHODS AND SYSTEMS FOR PIPELINE TEMPERATURE CONTROL OF SMART GAS BASED ON INTERNET OF THINGS (IOT)

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Xiaojun Wei, Chengdu (CN); Guanghua Huang, Chengdu (CN); Yunsong Gu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/173,784

(22) Filed: Apr. 8, 2025

(65) Prior Publication Data
US 2025/0237360 A1    Jul. 24, 2025

(30) Foreign Application Priority Data
Feb. 28, 2025  (CN) .......................... 202510230457.X

(51) Int. Cl.
*F17D 5/00*  (2006.01)
*F17D 3/00*  (2006.01)
(Continued)

(52) U.S. Cl.
CPC .............. *F17D 5/005* (2013.01); *F17D 3/00* (2013.01); *G05B 13/0265* (2013.01); *G05B 15/02* (2013.01)

(58) Field of Classification Search
CPC ........... F17D 3/00; F17D 5/005; G05B 15/02; G05B 19/406; G05B 13/0265
(Continued)

(56) References Cited

U.S. PATENT DOCUMENTS 4,921,399 A * 5/1990 Lew .................... F04D 27/0207
                                                       415/28
10,288,225 B2 * 5/2019 Kristiansen ............. E21B 44/06
(Continued)

FOREIGN PATENT DOCUMENTS

CA          1105114 A       7/1981
CN        109696209 A       4/2019
(Continued)

OTHER PUBLICATIONS

First Office Action in Chinese Application No. 202510230457.X mailed on Apr. 14, 2025, 10 pages.
(Continued)

*Primary Examiner* — Ronald D Hartman, Jr.
(74) *Attorney, Agent, or Firm* — METIS IP LLC

(57) ABSTRACT

Disclosed is a method and a system for pipeline temperature control of smart gas based on IoT. The method is implemented based on the system for pipeline temperature control of smart gas based on IoT, comprising: obtaining pipeline information of a gas pipeline and basic perceptual data collected and uploaded by a gas equipment object platform, obtaining at least one candidate parameter from a government safety supervision management platform, and determining at least one transportation parameter based on at least one iterative interaction with the government safety supervision management platform; and controlling, based on the at least one transportation parameter, an air compression device of the gas equipment object platform to adjust a gas transportation temperature.

9 Claims, 10 Drawing Sheets

(51) Int. Cl.
*G05B 13/02* (2006.01)
*G05B 15/02* (2006.01)

(58) Field of Classification Search
USPC .......................................................... 700/282
See application file for complete search history.

(56) References Cited

U.S. PATENT DOCUMENTS

| | | | |
|---|---|---|---|
| 11,859,596 B2* | 1/2024 | Chen | ........................ F01K 3/186 |
| 12,038,139 B2* | 7/2024 | Shao | .......................... F17D 1/20 |
| 2012/0304760 A1 | 12/2012 | Kim et al. | |
| 2023/0079768 A1 | 3/2023 | Shao et al. | |
| 2023/0280264 A1 | 9/2023 | Shao et al. | |
| 2024/0183500 A1* | 6/2024 | Song | .......................... F17D 5/06 |

FOREIGN PATENT DOCUMENTS

| | | | | | |
|---|---|---|---|---|---|
| CN | 110826261 A | | 2/2020 | | |
| CN | 115177820 A | | 10/2022 | | |
| CN | 113124327 B | | 11/2022 | | |
| CN | 112066136 B | * | 8/2023 | .............. | F16L 53/00 |
| CN | 113958867 B | | 1/2024 | | |
| CN | 117746334 A | | 3/2024 | | |
| CN | 118010120 A | * | 5/2024 | ........... | G01F 15/043 |
| CN | 119178076 B | * | 3/2025 | ............. | G01N 25/20 |
| CN | 119713151 B | * | 5/2025 | | |
| JP | 2005030679 A | | 2/2005 | | |
| RU | 2007142079 A | | 5/2009 | | |

OTHER PUBLICATIONS

Notification to Grant Patent Right for Invention in Chinese Application No. 202510230457.X mailed on May 1, 2025, 5 pages.
Deng, Jinwei, Application Analysis of Leakage Detection And Location Schemes For Urban Gas Pipelines, Urban gas, 2015, 6 pages.
Zheng, Fengshou et al., Research on Building the Smart Management Platform of Urban Underground Pipeline, Chinese Journal of Underground Space and Engineering, 11: 378-382, 2015.
Wang, Fei et al., Progress in the Research on the Thermo-Mechanical Interaction Between Oil Pipeline and Permafrost in Cold Regions, Journal of Glaciology and Geocryology, 44(1): 217-228, 2022.

* cited by examiner

400

Determining, based on the temperature effect of a gas pipeline, at least one candidate parameter, pipeline information, and basic perceptual data, a deformation assessment of the gas pipeline — S410

Obtaining at least one updated candidate parameter by updating, based on the deformation assessment of the gas pipeline, the at least one candidate parameter — S420

In response to determining that the deformation assessment of the gas pipeline satisfies a preset deformation condition, determining the at least one updated candidate parameter as at least one transportation parameter — S430

FIG. 4

METHODS AND SYSTEMS FOR PIPELINE TEMPERATURE CONTROL OF SMART GAS BASED ON INTERNET OF THINGS (IOT)

CROSS-REFERENCE TO RELATED APPLICATIONS

This application claims priority to Chinese Application No. 202510230457.X, filed on Feb. 28, 2025, the entire contents of which are incorporated herein by reference.

TECHNICAL FIELD

The present disclosure relates to the field of gas pipelines, and in particular to a method and a system for pipeline temperature control of smart gas based on an Internet of Things (IoT).

BACKGROUND

Natural gas pipelines, as important infrastructures for modern energy transportation, undertake the important responsibility of safely and efficiently transporting natural gas. It is crucial to maintain a suitable temperature for the natural gas pipelines. Too high or too low a temperature is not conducive to transportation. If the temperature in the natural gas pipelines is too low, the water in the natural gas may form hydrate, which in turns accumulates liquid and freezes, leading to pipeline blockage and reducing the transportation efficiency of the natural gas. High temperature is particularly challenging as it tends to cause the pipeline to expand and deform under pressure, which causes the pipeline to lose the bearing capacity, shortens the service life, and even leads to the risk of rupture, threatening the stability and safety of energy supply.

CN113124327B discloses a monitoring device for a natural gas pipeline, which monitors temperature and pressure data by utilizing a natural gas pipeline sensor, evaluates the risk of leakage based on the combination criterion of temperature and pressure, and establishes a pipeline coordinate system to locate and alarm a leakage point. However, this solution does not consider adjusting the pipeline by means of refrigeration or gas flow regulation to reduce the risk of leakage.

Therefore, it is desirable to provide a method and a system for pipeline temperature control of smart gas based on an Internet of Things (IoT). By introducing an intelligent IoT system, a temperature monitoring technique, and emergency response measures, real-time and accurate monitoring of the temperature of the gas pipeline is achieved, and effective measures are taken to intervene and regulate the source of the problem, thereby ensuring the safe and stable operation of the natural gas pipeline and guaranteeing the continuity and reliability of natural gas supply.

SUMMARY

One or more embodiments of the present disclosure provide a method for pipeline temperature control of smart gas based on an Internet of Things (IoT), implemented based on a system for pipeline temperature control of smart gas based on an Internet of Things (IoT). The method may comprise: obtaining, based on a gas company management platform, pipeline information of a gas pipeline and basic perceptual data collected and uploaded by a gas equipment object platform, obtaining at least one candidate parameter from a government safety supervision management platform, and determining at least one transportation parameter based on at least one iterative interaction with the government safety supervision management platform; and controlling, based on the at least one transportation parameter, an air compression device of the gas equipment object platform to adjust a gas transportation temperature. The at least one iterative interaction may include: the gas company management platform determining, based on the at least one candidate parameter, the pipeline information, and environmental information, a temperature effect of the gas pipeline through a first model; the first model being a machine learning model; sending the temperature effect of the gas pipeline to the government safety supervision management platform; the government safety supervision management platform determining, based on the temperature effect of the gas pipeline, the at least one candidate parameter, the pipeline information, and the basic perceptual data, a deformation assessment of the gas pipeline; obtaining at least one updated candidate parameter by updating, based on the deformation assessment of the gas pipeline, the at least one candidate parameter; and in response to determining that the deformation assessment of the gas pipeline satisfies a preset deformation condition, determining the at least one updated candidate parameter as the at least one transportation parameter.

One or more embodiments of the present disclosure provide a system for pipeline temperature control of smart gas based on an Internet of Things (IoT). The system may comprise a management platform, a sensor network platform, and a gas equipment object platform respectively configured on different servers. The management platform may include a gas company management platform and a government safety supervision management platform. The gas company management platform and the government safety supervision management platform may perform data exchange through the sensor network platform. The sensor network platform may include a gas company sensor network platform and a government safety supervision sensor network platform. The sensor network platform may operate based on a data communication device. The gas company management platform may be configured to: obtain pipeline information of a gas pipeline and basic perceptual data collected and uploaded by the gas equipment object platform, obtain at least one candidate parameter from the government safety supervision management platform, and determine at least one transportation parameter based on at least one iterative interaction with the government safety supervision management platform; and control, based on the at least one transportation parameter, an air compression device of the gas equipment object platform to adjust a gas transportation temperature. The at least one iterative interaction may include: determining, based on the at least one candidate parameter, the pipeline information, and environmental information, a temperature effect of the gas pipeline through a first model; the first model being a machine learning model; sending the temperature effect of the gas pipeline to the government safety supervision management platform; the governmental safety supervision management platform being configured to: determine, based on the temperature effect of the gas pipeline, the at least one candidate parameter, the pipeline information, and the basic perceptual data, a deformation assessment of the gas pipeline; obtain at least one updated candidate parameter by updating, based on the deformation assessment of the gas pipeline, the at least one candidate parameter; and in response to determining that the deformation assessment of the gas pipeline satisfies a preset deformation condition, determine the at least one updated candidate parameter as the at least one transportation parameter.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein:

FIG. 4 is a flowchart illustrating an exemplary process of determining at least one transportation parameter according to some embodiments of the present disclosure;

DETAILED DESCRIPTION

Figure 1:
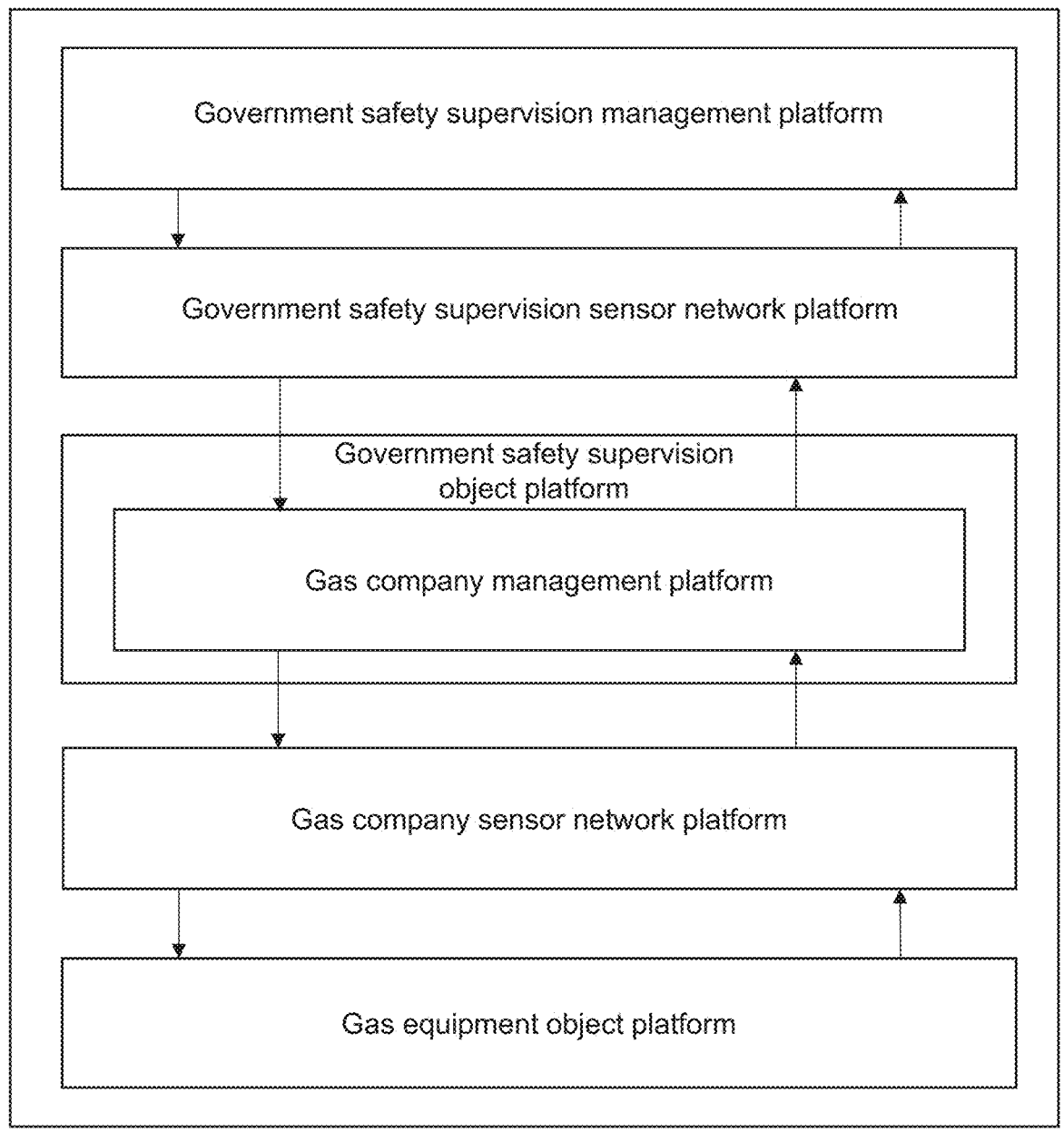
FIG. 1 is a schematic diagram illustrating an exemplary IoT system for pipeline temperature control of smart gas according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system," "device," "unit" and/or "module" used herein are a way to distinguish between different components, elements, parts, sections, or assemblies at different levels. However, the terms may be replaced by other expressions if other words accomplish the same purpose.

As shown in the present disclosure and in the claims, unless the context clearly suggests an exception, the words "one," "a," "an," "one kind," and/or "the" do not refer specifically to the singular, but may also include the plural. Generally, the terms "including" and "comprising" suggest only the inclusion of clearly identified steps and elements, however, the steps and elements that do not constitute an exclusive list, and the method or apparatus may also include other steps or elements.

Flowcharts are used in the present disclosure to illustrate the operations performed by a system according to embodiments of the present disclosure, and the related descriptions are provided to aid in a better understanding of the magnetic resonance imaging method and/or system. It should be appreciated that the preceding or following operations are not necessarily performed in an exact sequence. Instead, steps can be processed in reverse order or simultaneously. Also, it is possible to add other operations to these processes or to remove a step or steps from these processes.

FIG. 1 is a schematic diagram illustrating an exemplary IoT system for pipeline temperature control of smart gas according to some embodiments of the present disclosure.

A data communication device is a device that is used in a control system for data exchange and transmission between different platforms. Exemplary data communication devices may include, but are not limited to, a gateway, or the like. In some embodiments, the data communication device supports data communication between a gas company management platform and a government safety supervision management platform, and between the gas company management platform and a gas equipment object platform to ensure that information is shared and processed in real time.

A management platform may be configured as a platform that coordinates the connection and collaboration between functional platforms.

The gas company management platform refers to a platform for data exchange with the government safety supervision management platform and the gas equipment object platform to jointly realize intelligent monitoring and management of a gas pipeline. In some embodiments, the gas company management platform may be configured to: obtain pipeline information of the gas pipeline and basic perceptual data collected and uploaded by the gas equipment object platform, obtain at least one candidate parameter from the government safety supervision management platform, and determine at least one transportation parameter based on at least one iterative interaction with the government safety supervision management platform; and control, based on the at least one transportation parameter, an air compression device of the gas equipment object platform to adjust a gas transportation temperature.

With the help of a sensor network platform, the gas company management platform can realize cooperative operation with government supervision departments through the data exchange with the government safety supervision management platform and the gas equipment object platform, so as to ensure the safety, efficient, and intelligent operation of the gas pipeline.

The government safety supervision management platform refers to a platform used for safety supervision of the gas pipelines and gas companies. In other words, an object platform (referred to as a government safety supervision object platform) of the government safety supervision management platform may include the gas company management platform.

In some embodiments, the government safety supervision management platform may be configured to: determine, based on a temperature effect of the gas pipeline, at least one candidate parameter, the pipeline information, and the basic perceptual data, a deformation assessment of the gas pipeline; obtain at least one updated candidate parameter by updating, based on the deformation assessment of the gas pipeline, the at least one candidate parameter; and in response to determining that the deformation assessment of the gas pipeline satisfies a preset deformation condition, determine the at least one updated candidate parameter as the at least one transportation parameter.

The government safety supervision management platform and the gas company management platform may be configured on separate servers to respectively process data and/or information obtained by the government safety supervision management platform and the gas company management platform and execute relevant program instructions.

The government safety supervision management platform can realize the safety supervision and intelligent management of the gas pipeline through the data exchange with the gas company management platform through the sensor network platform, which ensures the safe operation of the gas pipeline and complies with the requirements of government supervision.

The sensor network platform may be configured as a communication network and a gateway. In some embodiments, the sensor network platform may include a gas company sensor network platform and a government safety supervision sensor network platform.

The gas company sensor network platform refers to a platform for data exchange data with the gas company management platform and the gas equipment object platform. In some embodiments, the gas company sensor network platform may receive the basic perceptual data uploaded by the gas equipment object platform and transmit the basic perceptual data to the gas company management platform.

The government safety supervision sensor network platform refers to a platform for data exchange with the government safety supervision management platform and the gas company management platform. In some embodiments, the government safety supervision sensor network platform may receive the temperature effect of the gas pipeline determined by the gas company management platform and transmit the temperature effect of the gas pipeline to the government safety supervision management platform. In some embodiments, the government safety supervision sensor network platform may further receive the at least one transportation parameter determined by the government safety supervision management platform and transmit the at least one transportation parameter to the gas company management platform, such that the gas company management platform can control the air compression device of the gas equipment object platform to adjust the gas transportation temperature based on the at least one transportation parameter.

The gas equipment object platform refers to a platform for obtaining data and/or information related to the gas pipeline. For example, the gas equipment object platform may be configured to obtain a variety of data such as an actual temperature and the basic perceptual data of an inspection point.

In some embodiments, the gas equipment object platform may include a plurality of sensor devices including, but not limited to, a temperature sensor, a flow meter, etc. In some embodiments, the gas equipment object platform may further include other devices, such as an interaction device.

More descriptions regarding the system for pipeline temperature control of smart gas based on IoT may be found in the related descriptions in the below (e.g., FIG. 2, etc.).

Figure 2:
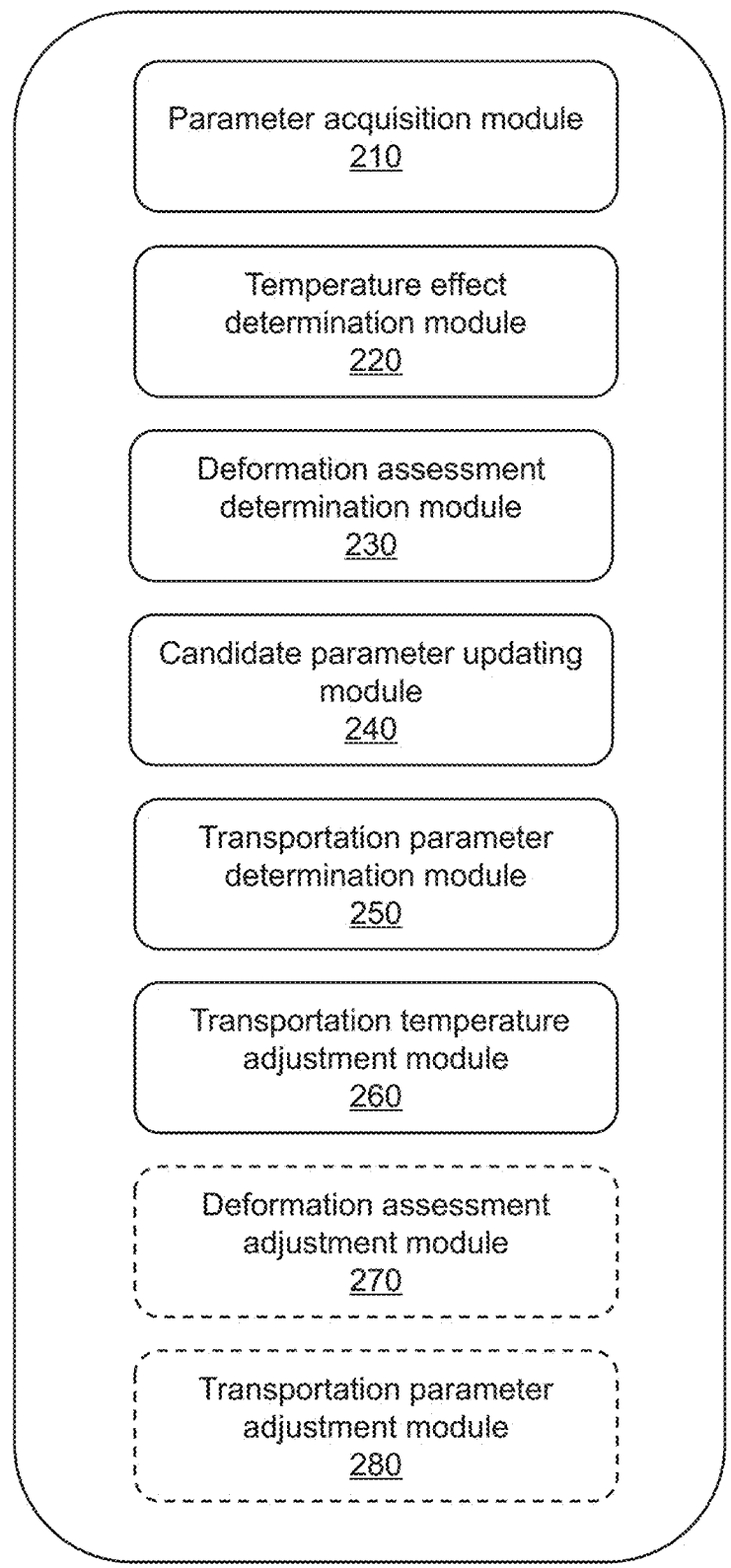
FIG. 2 is a block diagram illustrating an exemplary management platform according to some embodiments of the present disclosure.

FIG. 2 is a block diagram illustrating an exemplary management platform according to some embodiments of the present disclosure.

As shown in FIG. 2, the management platform may be provided with a parameter acquisition module 210, a temperature effect determination module 220, a deformation assessment determination module 230, a candidate parameter updating module 240, a transportation parameter determination module 250, and a transportation temperature adjustment module 260.

In some embodiments, the parameter acquisition module 210, the temperature effect determination module 220, the deformation assessment determination module 230, the candidate parameter updating module 240, the transportation parameter determination module 250, and the transportation temperature adjustment module 260 may be in communication connection. Exemplary communication connections may include, but are not limited to, Bluetooth, WIFI, 5G, or the like.

In some embodiments, the parameter acquisition module 210, the temperature effect determination module 220, the deformation assessment determination module 230, the candidate parameter updating module 240, the transportation parameter determination module 250, and the transportation temperature adjustment module 260 may be provided with a processor, respectively, or may share a common processor.

The processor may be configured to process data and/or information obtained from other devices or system components. The processor may execute program instructions based on the data, the information, and/or processing results to perform one or more of the functions described in the present disclosure. In some embodiments, the processor may comprise one or more sub-processing devices (e.g., a single-core processing device or a multi-core processing device). Merely by way of example, the processor may include a central processing unit (CPU), a controller, a microprocessor, or the like, or any combination thereof.

In some embodiments, the parameter acquisition module 210 may be configured to obtain basic perceptual data, at least one candidate parameter, and pipeline information.

In some embodiments, the parameter acquisition module 210 may include a sensor device. Exemplary sensor devices may include, but are not limited to, a temperature sensor, a velocity sensor, a flow meter, etc. In some embodiments, the temperature sensor and the flow meter may be provided at different positions (e.g., a transportation station, etc.) of the gas pipeline to collect an external temperature and a gas transportation rate of the gas pipeline at the different positions, respectively.

In some embodiments, the parameter acquisition module 210 may further include an interaction device, including an electronic component with an interaction capability, such as an operation console, a desktop computer, etc. In some embodiments, a manager may input the at least one candidate parameter and the pipeline information via the interaction device.

In some embodiments, the temperature effect determination module 220 may be configured to determine, based on the at least one candidate parameter, the pipeline information, and environmental information, the temperature effect of the gas pipeline through a first model.

In some embodiments, the deformation assessment determination module 230 may be configured to determine a deformation assessment of the gas pipeline based on the temperature effect of the gas pipeline, the at least one candidate parameter, the pipeline information, and the basic perceptual data.

In some embodiments, the gas pipeline may include a plurality of pipeline segments. The deformation assessment determination module 230 may be further configured to determine the deformation assessment of the gas pipeline based on the temperature effect of the gas pipeline, the at least one candidate parameter, the pipeline information, and the basic perceptual data through a second model. The second model may be a machine learning model. The second model may include a plurality of deformation layers. Each of the deformation layers may be configured to determine a deformation assessment of one of the plurality of pipeline segments.

In some embodiments, the candidate parameter updating module 240 may be configured to update the at least one candidate parameter based on the deformation assessment of the gas pipeline to obtain at least one updated candidate parameter.

In some embodiments, the candidate parameter updating module 240 may be further configured to determine, based on a deformation assessment corresponding to the at least one candidate parameter, a first amplitude of the at least one candidate parameter; determine, based on a consistency of the deformation assessment and a gas flow direction, a second amplitude of the at least one candidate parameter; and update, based on the first amplitude and the second amplitude, the at least one candidate parameter.

In some embodiments, the transportation parameter determination module 250 may be configured to determine the at least one updated candidate parameter as the at least one transportation parameter in response to determining that the deformation assessment of the gas pipeline satisfies a preset deformation condition.

In some embodiments, the transportation temperature adjustment module 260 may be configured to control, based on the at least one transportation parameter, the air compression device of the gas equipment object platform to adjust the gas transportation temperature.

In some embodiments, the system 200 for pipeline temperature control of smart gas based on IoT may further include a deformation assessment adjustment module 270 and a transportation parameter adjustment module 280. In some embodiments, the deformation assessment adjustment module 270 and the transportation parameter adjustment module 280 may be in communication connection with the parameter acquisition module 210, the temperature effect determination module 220, the deformation assessment determination module 230, the candidate parameter updating module 240, the transportation parameter determination module 250, and the transportation temperature adjustment module 260. In some embodiments, the deformation assessment adjustment module 270 and the transportation parameter adjustment module 280 may be provided with a processor, respectively, or share a processor with other modules.

In some embodiments, the deformation assessment adjustment module 270 may be configured to: for each of the plurality of pipeline segments, determine, based on the pipeline information, the environmental information, the at least one transportation parameter, inlet data of the pipeline segment, and historical pipeline leakage information, a first confidence level of the pipeline segment; and adjust, based on the first confidence level of the pipeline segment, the deformation assessment of the pipeline segment.

In some embodiments, the gas pipeline may be provided with a plurality of inspection points. The deformation assessment adjustment module 270 may be further configured to obtain actual temperatures of the plurality of inspection points; determine a second confidence level of the pipeline segment based on the actual temperatures of the plurality of inspection points and historical predictions of the plurality of inspection points; and adjust, based on the first confidence level and the second confidence level, the deformation assessment of the pipeline segment.

In some embodiments, the gas pipeline may be provided with the plurality of inspection points, the plurality of inspection points corresponding to at least one transportation station. The transportation parameter adjustment module 280 may be configured to obtain the actual temperatures of the plurality of inspection points; determine a confidence level of the at least one transportation station corresponding to the plurality of inspection points based on the actual temperatures of the plurality of inspection points and the historical predictions of the plurality of inspection points; and adjust the at least one transportation parameter based on the confidence level of the at least one transportation station.

It should be noted that the above description of the management platform and the modules thereof is only for descriptive convenience, and does not limit the present disclosure to the scope of the cited embodiments. It is understood that for those skilled in the art, after understanding the principle of the system for pipeline temperature control of smart gas based on IoT, it is possible to arbitrarily combine various modules without departing from this principle, or constitute a subsystem to connect with other modules. In some embodiments, the parameter acquisition module 210, the temperature effect determination module 220, the deformation assessment determination module 230, the candidate parameter updating module 240, the transportation parameter determination module 250, the transportation temperature adjustment module 260, the deformation assessment adjustment module 270, and the transportation parameter adjustment module 280 disclosed in FIG. 2 may be different modules in a single system, or a single module realizing the functions of two or more of the aforementioned modules. For example, the individual modules may share a common storage module, and the individual modules may each have their own storage module. Such variations are within the scope of protection of the present disclosure.

Figure 3:
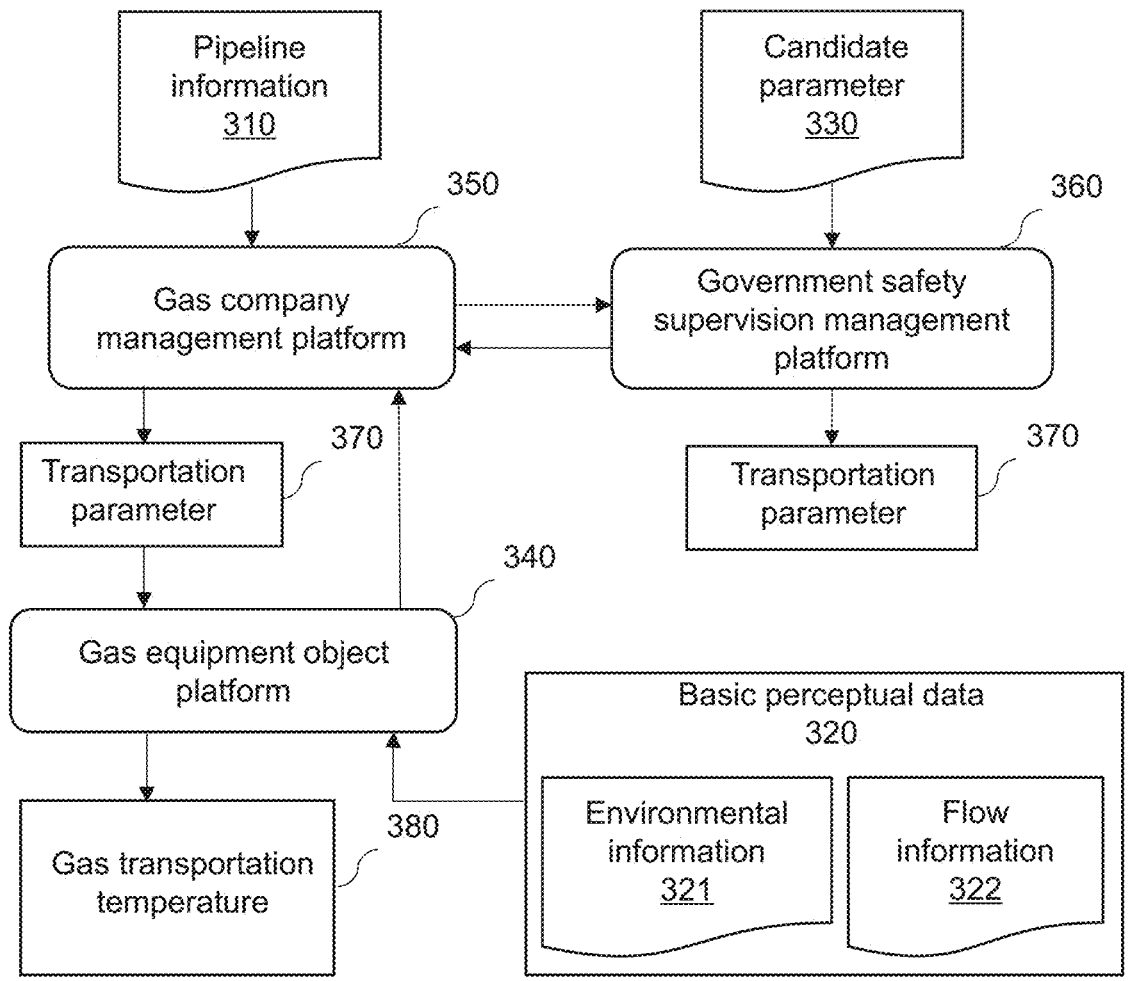
FIG. 3 is a schematic diagram illustrating an exemplary method for pipeline temperature control of smart gas based on IoT according to some embodiments of the present disclosure.

FIG. 3 is a schematic diagram illustrating an exemplary method for pipeline temperature control of smart gas based on IoT according to some embodiments of the present disclosure.

Some embodiments of the present disclosure provide the method for pipeline temperature control of smart gas based on IoT. The method may be implemented based on a system for pipeline temperature control of smart gas based IoT. In some embodiments, the system for pipeline temperature control of smart gas based on IoT may include a management platform, a sensor network platform, and a gas equipment object platform configured on separate servers, respectively. The management platform may include a gas company management platform and a government safety supervision management platform. More descriptions regarding the system for pipeline temperature control of smart gas based on IoT may be found in FIGS. 1-2 and the related descriptions thereof.

As shown in FIG. 3, the method for pipeline temperature control of smart gas based on IoT may include: obtaining, based on a gas company management platform 350, pipeline information 310 of a gas pipeline and basic perceptual data 320 collected and uploaded by a gas equipment object platform 340, and obtaining at least one candidate parameter 330 from a government safety supervision management platform 360, determining at least one transportation parameter 370 through iterative interaction with the government safety supervision management platform 360; and controlling, based on the at least one transportation parameter 370, an air compression device of the gas equipment object platform 340 to adjust a gas transportation temperature 380.

The pipeline information of the gas pipeline refers to a variety of data and/or information related to the gas pipeline. In some embodiments, the pipeline information of the gas pipeline may include at least one of a topology, a length, a pipeline diameter, a degree of curvature, a material, and a thickness of the gas pipeline.

In some embodiments, the pipeline information of the gas pipeline may further include setting information of a bellows compensator. The setting information of the bellows compensator is information related to a setting position of the bellows compensator.

The bellows compensator is a compensation element used in a pipeline system, which is mainly configured to compensate for a dimensional change due to a temperature change, a mechanical displacement, a vibration, etc., so as to ensure the safe and stable operation of the pipeline system. The operation principle of the bellows compensator is based on the "bellows effect", i.e., forming a bellows shape on a pipe blank by hydraulic or mechanical means to make the pipe blank has the flexibility and compensation ability.

In some embodiments, the gas company management platform may retrieve the pipeline information of the gas pipeline directly from a database. In some embodiments, the pipeline information of the gas pipeline may also be obtained by input from a manager.

The basic perceptual data refers to information related to the gas pipeline and gas transmission. In some embodiments, as shown in FIG. 3, the basic perceptual data 310 may include at least one of environmental information 321 and flow information 322.

In some embodiments, the basic perceptual data may be collected by a sensor device (e.g., the temperature sensor, the flow meter, etc.) located on different gas pipeline or valve positions, and then uploaded by the sensor device to the gas equipment object platform for summary and storage, and the gas equipment object platform may upload the basic perceptual data to the gas company management platform in accordance with a preset report rule. The preset report rule may be determined based on manual input or prior experience. For example, the preset report rule may include reporting the basic perceptual data to the gas company management platform at a preset time interval (e.g., 30 s, 1 min). More descriptions regarding obtaining the basic perceptual data may be found in FIG. 1 and the related descriptions thereof.

The environmental information refers to gas temperature information and external environmental information of the gas pipeline at different positions. In some embodiments, the external environmental information may include at least one of a soil layer thickness and an external temperature associated with a specific position.

The specific position is a position in the gas pipeline where the environmental information needs to be emphasized. The specific position may be determined artificially. The soil layer thickness is a depth of the gas pipeline buried in a soil layer, which may be determined from pipeline mounting information. The pipeline mounting information may include mounting information (e.g., the soil layer thickness of the gas pipeline, a mounting position, etc.) related to the gas pipeline at the time of initial mounting. In some embodiments, the pipeline mounting information may be obtained by manual input. The external temperature may be acquired in real time by the temperature sensor.

The gas temperature information is a temperature of the gas in the gas pipeline. In some embodiments, the gas temperature information may be acquired in real time by the temperature sensor.

The flow information is information related to transmission of the gas in the gas pipeline. In some embodiments, the flow information may include at least one of an inlet flow and an outlet flow. In some embodiments, the flow information may be obtained by the flow meter.

The at least one candidate parameter is a temperature or rate at which the gas is transmitted along a gas flow direction. More descriptions regarding the gas flow direction may be found in FIG. 9 and the related descriptions thereof.

In some embodiments, the at least one candidate parameter may include at least one of a candidate gas transportation temperature and a candidate gas transportation rate of each of at least one transportation station. More descriptions regarding the at least one transportation station may be found in the related descriptions below (e.g., FIG. 10, etc.).

In some embodiments, the at least one candidate parameter may be obtained by managerial input.

The at least one transportation parameter refers to a parameter associated with transmission of the gas in the gas pipeline. In some embodiments, the at least one transportation parameter may include at least one of a gas transportation temperature and a gas transportation rate at each of the at least one transportation station.

The gas transportation temperature is a temperature of gas transmission. The gas transportation rate is a rate of gas transmission. In some embodiments, each of the at least one transportation station may set a gas transportation temperature and a gas transportation rate of the transportation station, and the gas transportation temperature and the gas transportation rate of each of the at least one transportation station may be the same or different.

In some embodiments, the gas company management platform may determine the at least one transportation parameter by obtaining the at least one transportation parameter from the government safety supervision management platform by performing at least one iterative interaction with the government safety supervision management platform. More descriptions regarding the government safety supervision management platform determining the at least one transportation parameter may be found in FIG. 4 and the related descriptions thereof.

The at least one iterative interaction may include: determining a temperature effect of the gas pipeline through a first model based on the at least one candidate parameter, pipeline information, and environmental information; and sending the temperature effect of the gas pipeline to the government safety supervision management platform.

The temperature effect of the gas pipeline reflects a temperature change in the gas pipeline. In some embodiments, the gas pipeline may include a plurality of pipeline segments, and thus the temperature effect of the gas pipeline may include a temperature effect of each of the plurality of pipeline segments.

In some embodiments, one of the at least one transportation station may be configured to control one or more gas pipelines or gas pipeline segments. When the transportation station controls the plurality of pipeline segments, the gas temperature in each of the plurality of pipeline segments may change during gas transportation because each of the plurality of pipeline segments is affected by a variety of factors (e.g., the external temperature, the gas transportation rate, the pipeline information, etc.). That is, the temperature effect of each of the plurality of pipeline segments may be the same or different.

In some embodiments, division points of the plurality of pipeline segments may be positions in the gas pipeline where both the flow meter and the temperature sensor are provided. In some embodiments, the gas pipeline may be divided to form the plurality of pipeline segments in any other feasible way, such as random division, etc. More descriptions regarding the plurality of pipeline segments and the division points thereof may be found in the related descriptions below (e.g., FIG. 5).

In some embodiments, the temperature effect of the gas pipeline may be represented as an array. For example, the temperature effect of the gas pipeline may be expressed as ((a1, b1, m11), (a1, b2, m12), . . . , (a2, b1, m21), . . . ). Where a1, a2 denote a pipeline segment 1 and a pipeline segment 2, respectively; b1, b2 denote a candidate parameter 1 and a candidate parameter 2, respectively; m11 denotes a temperature effect of the pipeline segment 1 under the candidate parameter 1, m12 denotes a temperature effect of the pipeline segment 1 under the candidate parameter 2, and m21 denotes a temperature effect of the pipeline segment 2 under the candidate parameter 1.

Merely by way of example, if m11 is +2° C. or −5° C., it means that an outlet temperature of the pipeline segment 1 increases by 2° C. or decreases by 5° C. with respect to an inlet temperature under the candidate parameter 1, i.e., the temperature effect of the candidate parameter 1 on the pipeline segment 1 is +2° C. or −5° C.

The outlet temperature refers to a gas temperature at which the gas is exported from each of the plurality of pipeline segments along the gas flow direction. The inlet temperature refers to a gas temperature when the gas enters each of the plurality of pipeline segments. In some embodiments, the outlet temperature of a previous segment may be the inlet temperature of a current segment. The current segment refers to a current segment of the gas pipeline; the previous segment refers to a segment of the gas pipeline located before the current segment, relative to the current segment. In some embodiments, the gas may flow to the current segment through the previous segment.

In some embodiments, the first model may determine the temperature effect of the gas pipeline by processing the at least one candidate parameter, the pipeline information, and the environmental information.

The first model refers to a model for determining the temperature effect of the gas pipeline. In some embodiments, the first model may be a machine learning model. For example, the first model may include any one of a deep neural networks (DNN) model, a neural network (NN) model, a recurrent neural network (RNN) model, or any combination thereof.

Figure 5:
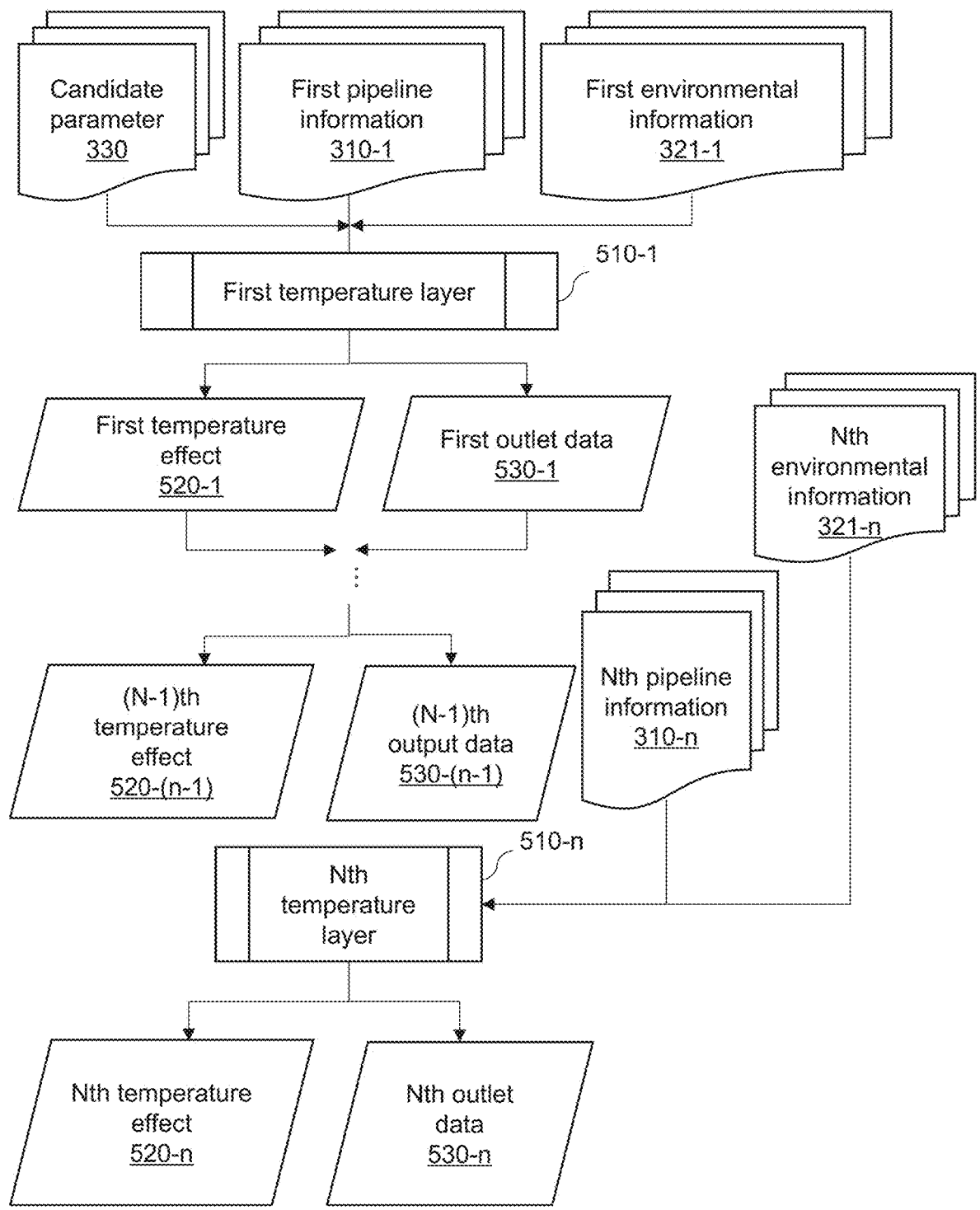
FIG. 5 is a schematic diagram illustrating an exemplary first model according to some embodiments of the present disclosure.

More descriptions regarding the first model determining the temperature effect of a gas pipeline may be found in FIG. 5 and the related descriptions thereof.

In some embodiments, the gas company management platform may determine the temperature effect of the gas pipeline based on the pipeline information and the environmental information by the following operations:

S1: a theoretical outlet temperature of a first pipeline segment may be calculated based on the at least one candidate parameter, the pipeline information, and the environmental information by Fourier's Law, Newton's Law of Cooling, and Stefan-Boltzmann Law, and a theoretical inlet temperature and the theoretical outlet temperature of each of the plurality of pipeline segments may be obtained.

As described above, the outlet temperature of the previous segment may be the inlet temperature of the current segment. Accordingly, for other pipeline segments, the theoretical outlet temperatures of the other pipeline segments may be calculated based on the theoretical outlet temperature of the previous segment, and the pipeline information and the environmental information of the current segment by Fourier's Law, Newton's Law of Cooling, and Stefan-Boltzmann Law. The theoretical inlet temperature and the theoretical outlet temperature of each of the plurality of pipeline segment may be obtained based on the theoretical outlet temperature of the first pipeline segment and the theoretical outlet temperatures of the other pipeline segments.

S2: a theoretical temperature difference of each of the plurality of pipeline segments may be calculated based on the theoretical inlet temperature and theoretical outlet temperature of each of the plurality of pipeline segments. For example, the theoretical temperature difference=|the theoretical outlet temperature−theoretical inlet temperature|.

S3: an actual measured inlet temperature and an actual measured outlet temperature of each of the plurality of pipeline segments may be determined based on the environmental information.

As described above, the environmental information may include the external temperature, and the division points of the pipeline segments may be the positions in the gas pipeline where both the flow meter and the temperature sensor are provided, such that the actual measured inlet temperature and the actual measured outlet temperature of each of the plurality of pipeline segments may be obtained based on the environmental information.

S4: an actual temperature difference of each of the plurality of pipeline segments may be calculated based on the actual measured inlet temperature and the actual measured outlet temperature of each of the plurality of pipeline segments. For example, the actual temperature difference=|the actual measured outlet temperature−the actual measured inlet temperature|.

S5: The temperature effect of each of the plurality of pipeline segments may be determined based on the theoretical temperature difference and the actual temperature difference. For example, the temperature effect=[theoretical temperature difference+actual temperature difference]/2.

In some embodiments, the gas company management platform may send the temperature effect of the gas pipeline to the government safety supervision management platform based on the sensor network platform.

In some embodiments, the gas company management platform may control operation of an air compression device based on the at least one transportation parameter to adjust the gas transportation temperature. Merely by way of example, if the gas temperature of the current transportation station is higher than the gas transportation temperature in the at least one transportation parameter, the gas company management platform may control the air compression device to perform cooling to reduce the gas temperature of the current transportation station so as to make the transportation station transport the gas according to the at least one transportation parameter. A temperature reduction magnitude in reducing the gas temperature may be a difference between the gas temperature of the current transportation station and the gas transportation temperature in the at least one transportation parameter. For example, if the gas transportation temperature in the at least one transportation parameter is 20° C. and the gas temperature of the current transportation station is 25° C., the temperature reduction magnitude is 5° C.

The air compression device, also known as an air compressor, primarily achieves a cooling effect using the compression and expansion of air. In some embodiments, the air compression device may be provided in each of the at least one transportation station and in communication connection with the gas company management platform, so as to adjust the gas transportation temperature in time under the control of the gas company management platform.

In some embodiments of the present disclosure, the gas company management platform can realize real-time supervision of the gas company and the gas pipeline by the government safety supervision management platform through the iterative interaction with the government safety supervision management platform. In addition, since the temperature of the gas in the gas pipeline changes during the gas transportation process, by sending the temperature effect of the gas pipeline to the government safety supervision management platform, the government safety supervision management platform can determine more accurate transportation parameter. The gas company management platform then controls the air compression device to adjust the gas transportation temperature based on the at least one transportation parameter, which can effectively avoid the safety problems of the gas pipeline due to the temperature being too high or too low, and is conducive to guaranteeing the gas transportation efficiency.

FIG. 4 is a flowchart illustrating an exemplary process of determining at least one transportation parameter according to some embodiments of the present disclosure. As shown in FIG. 4, a process 400 may include the following operations. In some embodiments, the process 400 may be performed by a government safety supervision management platform.

In S410, a deformation assessment of a gas pipeline may be determined based on a temperature effect of the gas pipeline, at least one candidate parameter, pipeline information, and basic perceptual data. In some embodiments, the operation 410 may be performed by the deformation assessment determination module 230.

More descriptions regarding the temperature effect, the at least one candidate parameter, the pipeline information, and the basic perceptual data may be found in FIG. 3 and the related descriptions thereof.

The deformation assessment of the gas pipeline refers to data on a possible deformation of the gas pipeline at different positions due to high or low temperatures. In some embodiments, the deformation assessment of the gas pipeline may include at least one of a deformation variable and a deformation probability of the gas pipeline.

The deformation probability is a probability that a deformation quantity exceeds a deformation threshold. The deformation threshold refers to a maximum value that can be reached by the deformation quantity, and the deformation threshold may be determined based on historical data, etc. In some embodiments, the deformation quantity and the deformation probability may be transformed to each other. For example, the deformation probability may be a ratio of the deformation quantity to the deformation threshold. As another example, the deformation quantity may be a product of the deformation probability and the deformation threshold.

As described above, the gas pipeline may include the plurality of pipeline segments, and thus the deformation assessment of the gas pipeline may include a deformation assessment of each of the plurality of pipeline segments.

In some embodiments, the deformation assessment of the gas pipeline may be represented as an array. For example, the deformation assessment may be expressed as ((a1, b1, d11), (a1, b2, d12), . . . , (a2, b1, d21), . . . ). Where a1 and a2 denote a pipeline segment 1 and a pipeline segment 2, respectively; b1 and b2 denote a candidate parameter 1 and a candidate parameter 2, respectively; d11 denotes a deformation quantity (or a deformation probability) of the pipeline segment 1 under the candidate parameter 1, d12 denotes a deformation quantity (or a deformation probability) of the pipeline segment 1 under the candidate parameter 2, and d21 denotes a deformation quantity (or a deformation probability) of the pipeline segment 2 under the candidate parameter 1.

Merely by way of example, if d11 is +1 mm or −0.5 mm, it means that the deformation quantity of the pipeline segment 1 is +1 mm or −0.5 mm under the candidate parameter 1, i.e., the gas may cause the pipeline segment 1 to undergo an increase in the pipeline diameter of 1 mm or a contraction in the pipeline diameter of 0.5 mm. If d11 is 90%, it means that the deformation probability of the pipeline segment 1 under the candidate parameter 1 is 90%.

In some embodiments, the government safety supervision management platform may determine the deformation assessment of the gas pipeline based on the temperature effect of the gas pipeline, the at least one candidate parameter, the pipeline information, and the basic perceptual data in various ways by the following operations.

S411: a pipeline expansion or a pipeline contraction due to a temperature change in each of the plurality of pipeline segments may be calculated based on the temperature effect of the gas pipeline and the pipeline information. Example equations for calculation may include: $\Delta D = \alpha \cdot D_0 \cdot \Delta T$. where $\Delta D$ denotes an amount by which the diameter of the pipeline segment increases or contracts due to the temperature change; $\alpha$ denotes a thermal expansion coefficient of a pipeline segment material; $D_0$ denotes an original diameter of the pipeline segment at an initial temperature; and $\Delta T$ denotes the temperature change.

S412: an actual measured inlet flow rate and an actual measured outlet flow rate of each of the plurality of pipeline segments may be determined based on the basic perceptual data.

As described above, the basic perceptual data may include the flow information, and the division points of the pipeline segment may be the positions of the gas pipeline where the flow meter is provided, so the actual measured inlet flow rate and the actual measured outlet flow rate of each of the plurality of pipeline segments may be obtained based on the basic perceptual data.

S413: a flow change in each of the plurality of pipeline segments may be calculated based on the actual measured inlet flow rate and the actual measured outlet flow rate of each of the plurality of pipeline segments. For example, the flow change=|actual measured outlet flow rate−actual measured inlet flow rate|.

S414: a pressure change due to the flow change in each of the plurality of pipeline segments may be calculated based on the flow change in each of the plurality of pipeline segments, the pipeline information, and the environmental information in the basic perceptual data according to a geometric feature of the pipeline segment and an equation related to hydrodynamics.

S415: a deformation of each of the plurality of pipeline segments due to the pressure change may be calculated based on the pressure change according to an equation for calculating a thin-walled cylinder strength.

S416: the deformation quantity (i.e., the deformation assessment) of each of the plurality of pipeline segments may be obtained by weighted summation based on the pipeline expansion or pipeline contraction due to the temperature change and the deformation due to the pressure change in each of of the plurality of pipeline segments. It should be noted that weight coefficients in the weighted summation may be determined based on past experience, etc.

Figure 6:
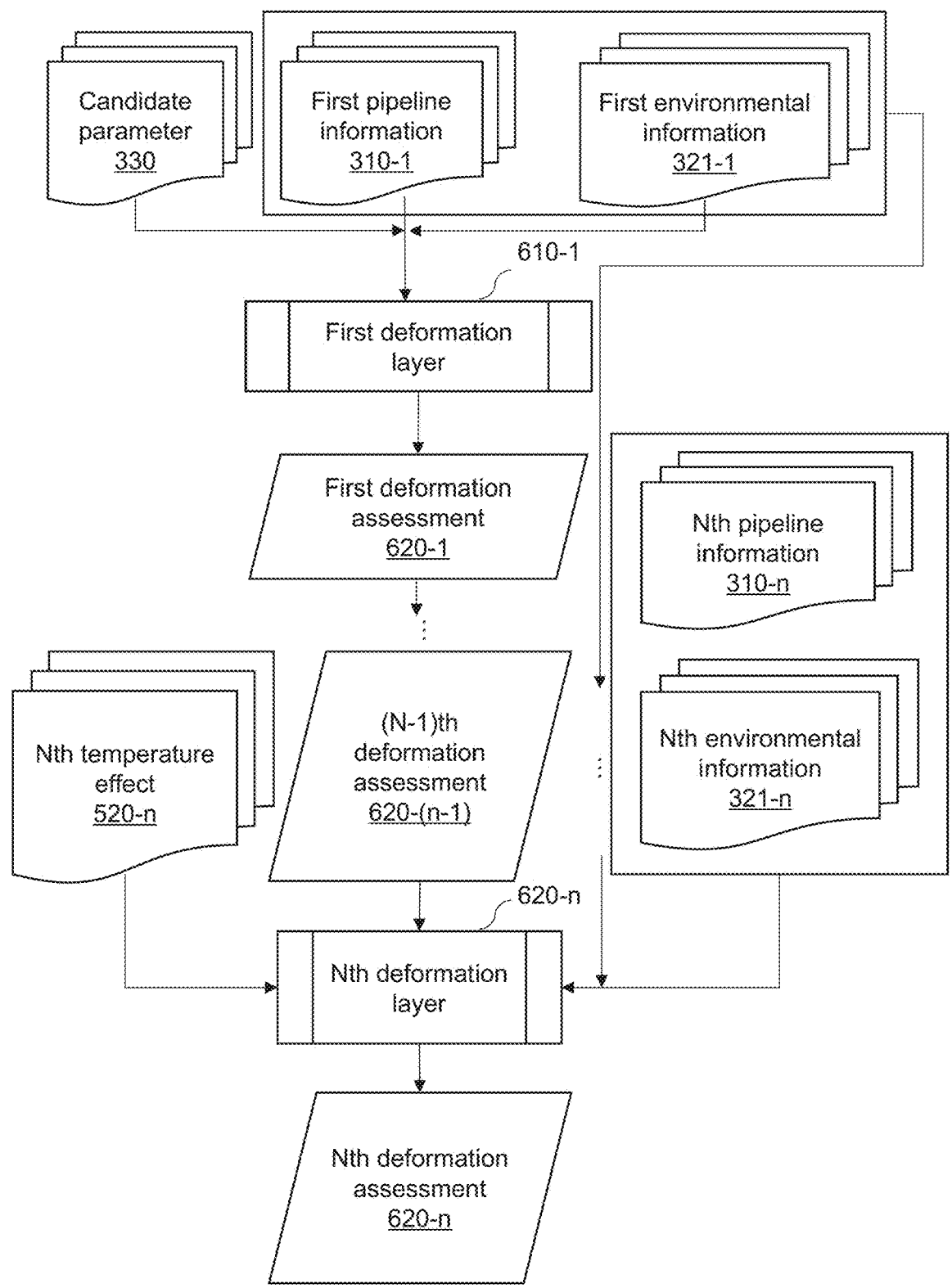
FIG. 6 is a schematic diagram illustrating an exemplary second model according to some embodiments of the present disclosure.

More descriptions regarding determining the deformation assessment of the gas pipeline may be found in FIG. 6 and the related descriptions thereof.

In S420, at least one updated candidate parameter may be obtained by updating, based on the deformation assessment of the gas pipeline, the at least one candidate parameter. In some embodiments, the operation 420 may be performed by the candidate parameter updating module 240.

The at least one updated candidate parameter may be an adjusted candidate parameter based on the deformation assessment of the gas pipeline.

In some embodiments, the government safety supervision management platform may obtain the at least one updated candidate parameter by updating the at least one candidate parameter based on the deformation assessment corresponding to the at least one candidate parameter through a preset rule. The preset rule may include reducing the gas transportation temperature in the at least one candidate parameter by a preset reduction magnitude in response to the deformation assessment exceeding the deformation threshold.

The preset reduction may be set manually in advance or determined based on a first preset table. For example, if a mean value of the deformation assessments (e.g., the deformation quantities) of the plurality of gas pipeline segments exceeds the deformation threshold by two times, the gas transportation temperature in the at least one candidate parameter may be reduced by 5° C. As another example, if the mean value of the deformation assessments (e.g., the deformation quantities) of the plurality of gas pipeline segments is between 1 and 2 times the deformation threshold, the gas transportation temperature in the at least one candidate parameter may be reduced by 2° C. In some embodiments, the first preset table may be constructed based on historical data.

Figure 9:
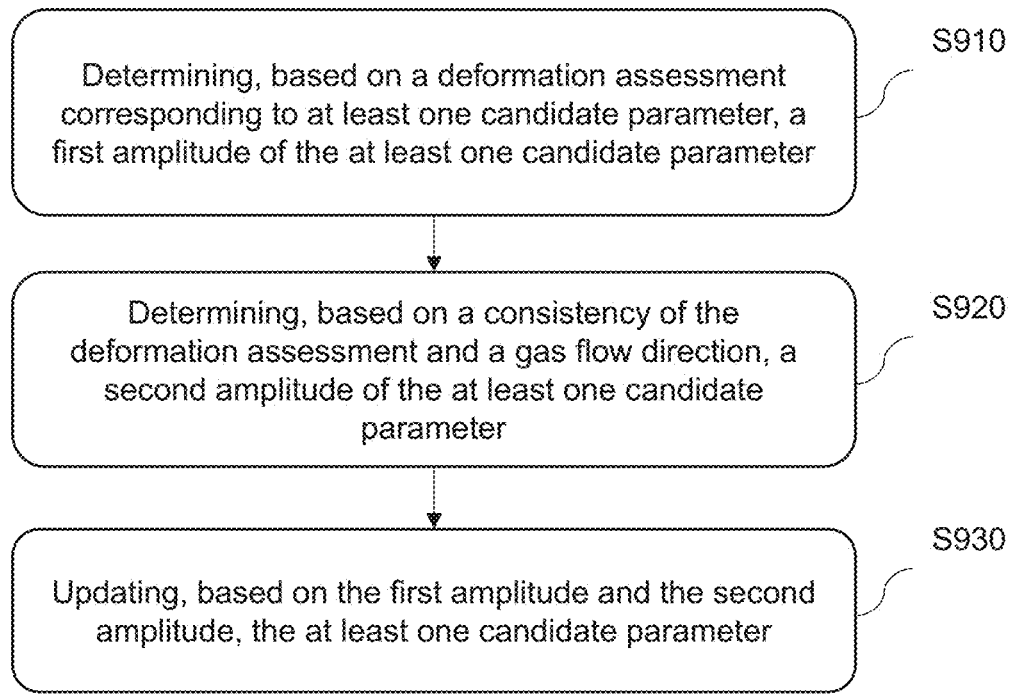
FIG. 9 is a flowchart illustrating an exemplary process of updating at least one candidate parameter according to some embodiments of the present disclosure.

More descriptions regarding updating the at least one candidate parameter based on the deformation assessment of the gas pipeline may be found in FIG. 9 and the related descriptions thereof.

In S430, in response to determining that the deformation assessment of the gas pipeline satisfies a preset deformation condition, the at least one updated candidate parameter may be determined as at least one transportation parameter. In some embodiments, the operation 430 may be performed by the transportation parameter determination module 250.

The preset deformation condition refers to a determination condition set in advance. In some embodiments, the preset deformation condition may include the mean value (or a maximum value) of the deformation assessments of the plurality of pipeline segments being less than a preset value, etc. The preset value may be set manually in advance.

In some embodiments, in response to determining that that the mean value (or the maximum value) of the deformation assessments of the plurality of pipeline segments is less than the preset value, the government safety supervision management platform may determine a candidate parameter corresponding to a smallest mean value (or the maximum value) of the deformation assessments of the plurality of pipeline segments as the transportation parameter.

Merely by way of example, if 100 pipeline segments and 10 candidate parameters are provided, 1000 deformation assessments are provided, where 100 of the 1000 deformation assessments are deformation assessments of different pipeline segments under the candidate parameter 1, 100 of the 1000 deformation assessments are deformation assessments of different pipeline segments under the candidate parameter 2, . . . , and 100 of the 1000 deformation assessments are deformation assessments of different pipeline segments under the candidate parameter 10. When the transportation parameter is determined based on the 10 candidate parameters, for each of the 10 candidate parameters, the mean value (or the maximum value) of the corresponding 100 deformation assessments is calculated, and the candidate parameter (e.g., the candidate parameter 2) corresponding to the smallest mean value (or the maximum value) of the 100 deformation assessments is determined as the transportation parameter.

In some embodiments, in response to determining that the deformation assessment of the gas pipeline does not satisfy the preset deformation condition (i.e., when the mean value (or the maximum value) of the deformation assessments of the plurality of pipeline segments exceeds the preset value), the government safety supervision management platform may reduce the gas transportation temperature in the at least one candidate parameter based on a first amplitude, and synchronously update of the deformation assessment of the gas pipeline based on the at least one candidate parameter after reduction until the deformation assessment of the gas pipeline satisfies the preset deformation condition. In this case, the transportation parameter is the candidate parameter in response to determining that the deformation assessment of the gas pipeline satisfies the preset deformation condition.

The first amplitude may be a fixed value. More descriptions regarding the first amplitude may be found in FIG. 9 and the related description thereof.

According to some embodiments of the present disclosure, the deformation assessment of the gas pipeline is determined based on the temperature effect of the gas pipeline, the at least one candidate parameter, the pipeline information, and the basic perceptual data, the possibility of causing deformation of the gas pipeline is analyzed from a plurality of perspectives, so as to obtain more comprehensive deformation assessment analysis data of the gas pipeline. Furthermore, the at least one candidate parameter is updated based on the deformation assessment until the deformation assessment satisfies the preset deformation condition, the at least one updated candidate parameter is determined as the at least one transportation parameter, and the at least one transportation parameter is adjusted within the permissible deformation quantity or deformation probability of the gas pipeline, such that the danger caused by serious deformation of the gas pipeline is avoided, the service life of the gas pipeline is prolonged, and the cost of maintenance or replacement is reduced.

It should be noted that the foregoing description of the process 400 is intended to be exemplary and illustrative only and does not limit the scope of application of the present disclosure. For a person skilled in the art, various corrections and changes can be made to the process 400 under the guidance of the present disclosure. However, these corrections and changes remain within the scope of the present disclosure.

FIG. 5 is a schematic diagram illustrating an exemplary first model according to some embodiments of the present disclosure.

In some embodiments, a gas pipeline may include a plurality of pipeline segments, and the first model may include a plurality of temperature layers, each of the plurality of temperature layers may be configured to determine a temperature effect and outlet data of one of the plurality of pipeline segments.

The pipeline segment is one of the plurality of pipeline segments into which the gas pipeline is divided according to a division point. In some embodiments, the temperature effect determination module 220 may segment the gas pipeline based on a pipeline length, at least one transportation station, or the like. For example, temperature effect determination module 220 may segment the gas pipeline by a preset pipeline length. The preset pipeline length may be determined based on, for example, past experience or historical data.

More descriptions regarding segmenting the gas pipeline may be found elsewhere in the present disclosure.

The temperature layers may be configured to determine the temperature effect and the outlet data of the pipeline segment. In some embodiments, one of the temperature layers may correspond to one of the pipeline segments, and one of the temperature layers may be configured to determine the temperature effect and the outlet data of the corresponding pipeline segment. In some embodiments, each of the temperature layers may be a neural network (NN) model.

The outlet data is data related to an outlet of the pipeline segment. In some embodiments, the outlet data may include at least one of an outlet temperature and an outlet rate.

In some embodiments, each of the plurality of pipeline segments may correspond to respective outlet data, and outlet data of a previous segment may be inlet data of a current segment. More descriptions regarding the previous segment and the current segment may be found in FIG. 3 and the related descriptions thereof.

The inlet data is data related to an inlet of the pipeline segment. In some embodiments, the inlet data may include at least one of an inlet temperature and an inlet rate.

In some embodiments, an input of each temperature layer 510 may include the inlet data, the pipeline information 310, and the environmental information 321 of the corresponding pipeline segment, and an output of each temperature layer 510 may include the temperature effect 520 and the outlet data 530 of the corresponding pipeline segment.

As shown in FIG. 5, for a first temperature layer (i.e., a temperature layer 510-1 corresponding to a first pipeline segment), an input of the first temperature layer may include inlet data (i.e., the at least one candidate parameter 330), first pipeline information (310-1), and first environmental information (321-1) of the first pipeline segment, and an output of the first temperature layer may include a first temperature effect (520-1) and first outlet data (530-1) of the first pipeline segment. For an Nth temperature layer (i.e., a temperature layer 510-$n$ corresponding to other pipeline segments), an input of the Nth temperature layer may include an (N−1)th temperature effect (520-$(n-1)$) and (N−1)th outlet data (530-$(n-1)$) of the previous segment, Nth pipeline information (310-$n$) and Nth environmental information (321-$n$) of the current segment, and an output of the Nth temperature layer may include an Nth temperature effect (520-$n$) and Nth outlet data (530-$n$) of the current segment.

It should be noted that subsequent segments are calculated iteratively between the plurality of temperature layers based on a gas flow direction. For example, an output of a previous temperature layer may be used as an input of a following temperature layer. However, if a sensor device (e.g., a temperature sensor, and a flow meter) is provided at the inlet of the following segment, it needs to use (e.g., the gas transportation temperature, and the gas data acquired by the sensor device in real time transportation rate) as the inlet data.

In some embodiments, an output of the first model may be a sequence consisting of the outlet data and the temperature effects output by all the temperature layers, such as ((the first outlet data, the first temperature effect), (the second outlet data, the second temperature effect), . . . , (the Nth outlet data, the Nth temperature effect)).

In some embodiments, the first temperature layer may be obtained by training based on a large number of first training samples with first sample labels. For example, the plurality of training samples with the labels may be input into an initial first temperature layer, a loss function may be constructed from the labels and results of the initial first temperature layer, and the loss function may be iteratively updated based on the loss function via gradient descent or other processes to update parameters of the initial first temperature layer. When a preset condition is satisfied, the training of the first temperature layer may be completed, and a trained first temperature layer may be obtained. The preset condition may be that the loss function converges, a count of iterations reaches a threshold, etc.

In some embodiments, the first training samples may include a sample parameter, sample pipeline information and sample environmental information of the first pipeline segment.

In some embodiments, the first sample labels may include an actual temperature effect and actual outlet data of the first pipeline segment under a sample parameter, the sample pipeline information of the first pipeline segment, and the sample environmental information. The actual temperature effect of the first pipeline segment may be a difference between an actual measured outlet temperature and an actual measured inlet temperature of the first pipeline segment. In some embodiments, the first training samples and the first sample labels may be obtained based on actual data.

In some embodiments, the Nth temperature layer may be obtained by training based on a large number of second training samples with the second sample labels using a similar training process as the first temperature layer, which is not repeated.

In some embodiments, the second training samples may include sample outlet data and a sample temperature effect of the previous segment, sample pipeline information and sample environmental information of the current segment.

In some embodiments, the second sample labels may include an actual temperature effect and actual outlet data of the current segment under the the sample outlet data and the sample temperature effect of the previous segment, the sample pipeline information and the sample environment information of the current segment. In some embodiments, the second training samples and the second sample labels may be obtained based on the actual data.

According to some embodiments of the present disclosure, the temperature effect and the outlet data of different pipeline segments can be more accurately and quickly obtained through the trained first model, thereby laying the foundation for subsequent accurate deformation assessment.

In some embodiments, since a change in a pipeline diameter of the gas pipeline, a pipeline bifurcation, and a pipeline intersection may have an effect on the gas transportation rate, the division points of the plurality of pipeline segments may include a pipeline diameter change section, a pipeline bifurcation position, and a pipeline intersection position of the gas pipeline.

In some embodiments, the temperature effect determination module 220 may determine the inlet rate of the current segment based on the outlet rate and a pipeline diameter of the previous segment. For example, the temperature effect determination module 220 may calculate the inlet rate of the current segment by hydrodynamics based on the outlet rate and the pipeline diameter of the previous segment.

According to some embodiments of the present disclosure, the division points of the gas pipeline are determined based on the pipeline diameter change position, the pipeline bifurcation position, and the pipeline intersection position of the gas pipeline, so as to make each of the plurality of pipeline segments have the same diameter, thereby further improving the prediction accuracy of the first model.

In some embodiments, the deformation assessment determination module 230 may determine the deformation assessment of the gas pipeline through a second model based on the temperature effect, the at least one candidate parameter, the pipeline information, and the basic perceptual data of the gas pipeline.

More descriptions regarding the deformation assessment of the gas pipeline may be found in FIG. 4 and the related descriptions thereof.

In some embodiments, the second model may be a machine learning model. For example, the second model may include any one of various feasible models such as an RNN model, a DNN model, or the like, or any combination thereof.

In some embodiments, the second model may include a plurality of deformation layers, and each of the plurality of deformation layers may be configured to determine the deformation assessment of one of the plurality of pipeline segments.

FIG. 6 is a schematic diagram illustrating an exemplary second model according to some embodiments of the present disclosure.

The deformation layer may be configured to determine the deformation assessment of each of the plurality of pipeline segments. In some embodiments, one of the deformation layers may correspond to one pipeline segment, and one of the deformation layers may be configured to determine the deformation assessment of one corresponding pipeline segment. In some embodiments, one of the deformation layers may be an NN model.

In some embodiments, an input of each deformation layer 610 may include the at least one candidate parameter 330, the pipeline information 310 of the corresponding pipeline segment, and the environmental information 321, and an output of each deformation layer 610 may include the deformation assessment of the corresponding pipeline segment 620.

As shown in FIG. 6, for a first deformation layer (i.e., a deformation layer 610-1 corresponding to the first pipeline segment), an input of the first deformation layer may include the inlet data (i.e., the at least one candidate parameter 330), the first pipeline information (310-1), and the first environmental information (321-1) of the first pipeline segment, and an output of the first deformation layer may include a first deformation assessment (620-1) of the first pipeline segment. For an Nth deformation layer (i.e., a deformation layer 610-n corresponding to other pipeline segments), an input of the Nth deformation layer may include an (N−1)th deformation assessment (620-($n$−1)) of the previous segment, the Nth pipeline information (310-$n$), the Nth environmental information (321-$n$), and the Nth temperature effect (520-$n$) of the current segment, and an output of the Nth deformation layer may include an Nth deformation assessment of a current segment (620-$n$).

Subsequent segments may be calculated iteratively between the plurality of deformation layers by the gas flow direction. For example, an output of the deformation layer of the previous segment may be used as an input of the deformation layer of a following segment. However, when a sensor device (e.g., a temperature sensor, and flow meter) is provided at an inlet of the following segment, it needs to use data (e.g., the gas transportation temperature, and the gas transportation rate) acquired by the sensor device in real time as the inlet data.

In addition, since a bellows compensator can compensate for a temperature difference deformation or other deformation of equipment and the gas pipeline, and has a great effect on the deformation assessment of the gas pipeline, the pipeline information in the input of the deformation layer also needs to include setting information of the bellows compensator to further improve the prediction accuracy of the second model. More descriptions regarding the setting information of the bellows compensator may be found in FIG. 3 and the related descriptions thereof.

In some embodiments, an output of the second model may include a sequence consisting of the deformation assessments output by all the deformation layers. For example, (a first deformation assessment, a second deformation assessment, . . . , an Nth deformation assessment).

In some embodiments, the first deformation layer may be obtained by training based on a large number of third training samples with third sample labels using a similar training process as the first temperature layer. More descriptions regarding the training process of the first temperature layer may be found in FIG. 5 and the related descriptions thereof.

In some embodiments, the third training samples may include a sample candidate parameter of the first pipeline segment, sample pipeline information, and sample environmental information.

In some embodiments, the third sample labels may include an actual deformation assessment of the first pipeline segment under the sample candidate parameter, the sample pipeline information, and the sample environmental information of the first pipeline segment. In some embodiments, the third training samples may be obtained based on historical data. The third sample labels may be determined based on an actual deformation. For example, a deformation is labeled as 1 and no deformation is labeled as 0. As another example, the actual deformation is labeled as deformation +1 mm, deformation +5 mm, deformation +0 mm, etc. In some embodiments, the actual deformation may be obtained based on historical pipeline leakage information and historical deformation data. The historical deformation data refers to a deformation of a pipeline found when the pipeline is maintained and inspected. More descriptions regarding the historical pipeline leakage information may be found in FIG. 7 and the related descriptions thereof.

In some embodiments, the Nth deformation layer may be obtained by training based on a large number of fourth training samples with the fourth sample labels using a similar training process as the first temperature layer.

In some embodiments, the fourth training samples may include a sample deformation assessment, sample pipeline information, and sample environment information of the previous segment, and a sample temperature effect, sample pipeline information, and sample environmental information of the current segment.

In some embodiments, the fourth sample labels may include an actual sample deformation assessment under the sample deformation assessment, the sample pipeline information, and the sample environmental information of the previous segment, and the sample temperature effect, the sample pipeline information, and the sample environmental information of the current segment. In some embodiments, the fourth sample labels may be determined based on the effect of the pipeline information and the environmental information of the current segment, and the pipeline information and the environmental information of the previous segment on the deformation assessment.

For example, if the pipeline diameter of the previous segment is large and the pipeline diameter of the current segment is small, the pressure of the current segment increases and the deformation increases, in this case, the deformation assessment of the current segment is a sum of a deformation quantity of the deformation assessment of the previous segment and an increase magnitude in the deformation. As another example, if the temperature of the current segment decreases (e.g., the temperature effect of the current segment or the external temperature at which the current segment is located in the environmental information decreases), the deformation of the current segment is reduced, in this case, the deformation assessment of the current segment is a difference between a deformation probability of the deformation assessment of the previous segment and a probability of the deformation being reduced.

In some embodiments, the training of the second model may further include determining different training sample sets and corresponding labels based on a transportation station distribution; and training the different training sample sets alternately according to sizes of the different training sample sets; the different training sample sets having different learning rates during the training, and the learning rates being adjusted based on training sample features.

The transportation station distribution may reflect a distribution of the at least one transportation station in a pipeline system. In some embodiments, the different training sample sets may be divided according to the transportation station distribution. For example, data from several transportation stations located within a range of a preset distance threshold may be used as a training sample set. The preset distance threshold may be set artificially in advance.

The learning rate (LR) is a hyperparameter in machine learning when updating weights during gradient descent. The learning rate controls a convergence speed, ensures model stability and accuracy, and affects model training efficiency. The lower the learning rate, the slower the loss function changes, and the easier it is to overfit. If the learning rate is too high, gradient explosion is caused, a loss vibration amplitude is relatively large, and the model is difficult to converge.

The training sample feature reflects features of the training samples (including the third training samples and the fourth training samples). In some embodiments, the training sample feature may include a source of the training samples and a reliability of the training samples.

The source of the training samples may include historical data of gas pipelines with different pressure levels. It is understood that gas pipelines of the same pressure level have a higher degree of similarity compared to gas pipelines of different pressure levels. For example, the pipeline information, the external temperatures, a pipeline maintenance, or the like, typically differ between a high pressure pipeline and a low pressure pipeline.

The reliability of the training samples is a consistency of the corresponding labels for same or similar training samples. If a plurality of labels are consistent or mostly consistent, the reliability of the training samples is high, and the training effect is better; if the plurality of labels are inconsistent (i.e., for the same or similar training samples, the corresponding actual deformation assessments are different), the reliability of the training samples is low, which leads to poor the training effect. The similarity of the training samples may be determined in various ways, such as feature extraction and representation, similarity measure, multimodal integration, clustering and classification, etc.

In some embodiments, the deformation assessment determination module 230 may determine the learning rates of different training sample sets during training by vector matching based on the training sample feature. For example, a first vector database may include a plurality of candidate vectors and corresponding candidate learning rates. The candidate vectors may be constructed based on the source of the training samples and the reliability of the training samples. The candidate learning rates corresponding to the candidate vectors may be determined based on the actual learning rates corresponding to the source of the training samples and the reliability of the training samples.

In some embodiments, the deformation assessment determination module 230 may construct a vector to be matched based on a current source of the training samples and a current reliability of the training samples, and calculate distances between the vector to be matched and the plurality of candidate vectors, respectively, and determine a candidate vector whose distance from the vector to be matched is less than a distance threshold as a target vector, and determine a candidate learning rate corresponding to the target vector as a current learning rate. The distance threshold may be set manually in advance based on past experience.

Figure 10:
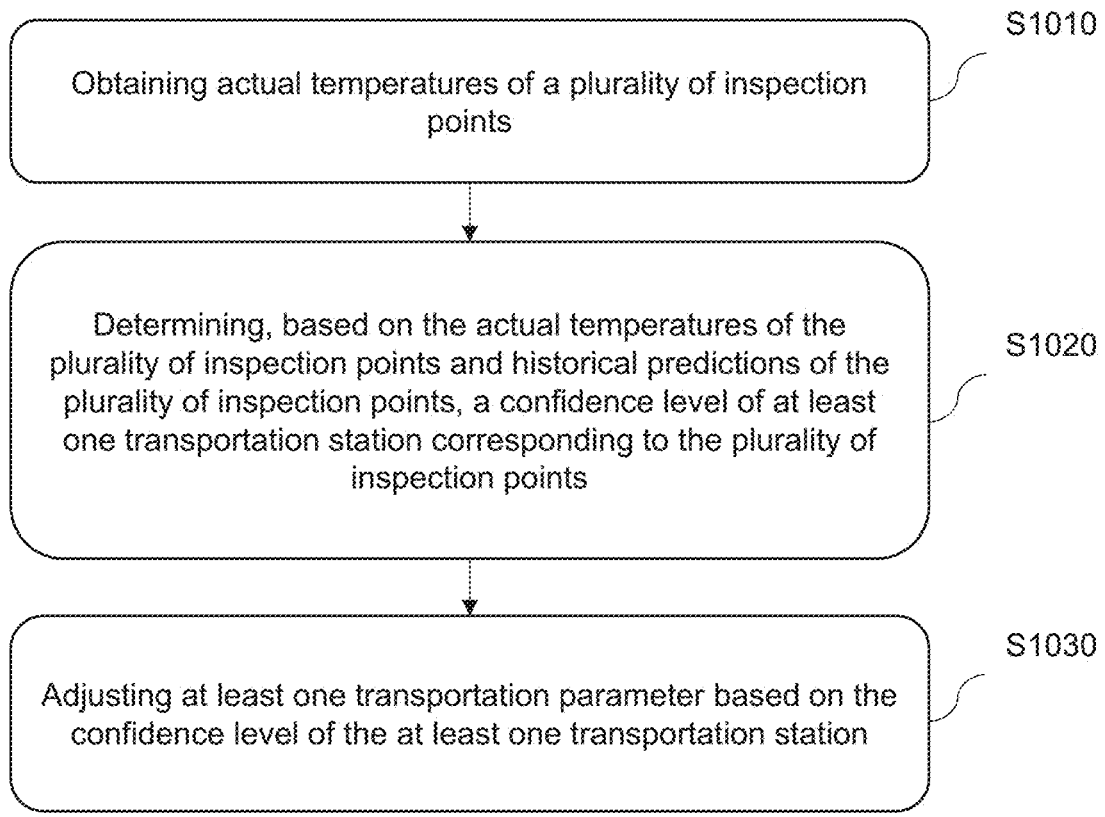
FIG. 10 is a flowchart illustrating an exemplary process of adjusting at least one transportation parameter according to some embodiments of the present disclosure.

More descriptions regarding the at least one transportation station may be found elsewhere in the preset disclosure (e.g. FIG. 3, and FIG. 10).

In some embodiments of the present disclosure, the deformation assessments of different pipeline segments can be obtained more accurately and quickly by the trained second model. The different training sample sets and the corresponding labels are trained alternately by the sizes based on the of transportation station distribution of the gas pipeline, which can quickly and accurately obtain deformation assessment results. Meanwhile, the learning rate is based on the training sample feature, thereby effectively reducing the training time and improving the stability of model training.

Figure 7:
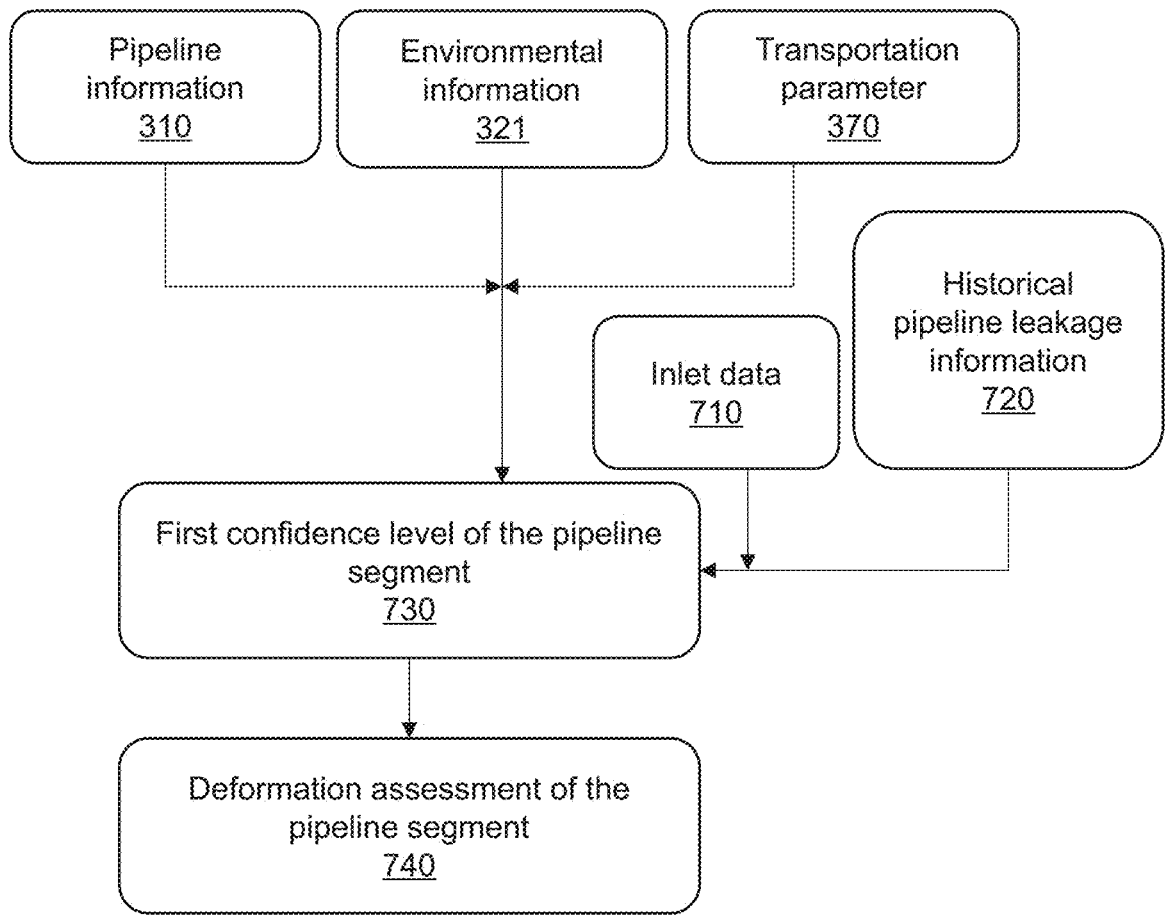
FIG. 7 is a schematic diagram illustrating an exemplary process of adjusting a deformation assessment of one of a plurality of pipeline segments according to some embodiments of the present disclosure.

FIG. 7 is a schematic diagram illustrating an exemplary process of adjusting a deformation assessment of one of a plurality of pipeline segments according to some embodiments of the present disclosure.

In some embodiments of present disclosure, as shown in FIG. 7, the deformation assessment adjustment module 270 may determine, for each of the plurality of pipeline segments, a first confidence level 730 of the pipeline segment based on the pipeline information 310, the environmental information 321, the at least one transportation parameter 370, inlet data 710 of the pipeline segment, and historical pipeline leakage information 720; and adjust a deformation assessment 740 of the pipeline segment based on the first confidence level 730 of the pipeline segment.

More descriptions regarding the pipeline information, the environmental information, the at least one transportation parameter, the pipeline segments and the inlet data of the pipeline segments may be found in the related descriptions above (e.g., FIG. 3 and FIG. 5).

The historical pipeline leakage information is information related to pipeline leakage occurs in the past. For example, the historical pipeline leak information may include a historical pipeline leakage position, etc.

In some embodiments, the deformation assessment adjustment module 270 may obtain the historical pipeline leakage information based on historical data.

The first confidence level refers to one of indexes configured to assess an adjustment magnitude or an adjustment range of the deformation assessment.

In some embodiments, the deformation assessment adjustment module 270 may determine the first confidence level based on a similarity between the deformation assessment (e.g., the deformation probability) of a current segment output by a second model and a target deformation probability. For example, the higher the similarity, the higher the first confidence level.

In some embodiments, the target deformation probability may be determined in various ways. For example, the deformation assessment adjustment module 270 may construct a second vector database based on the historical data, and retrieve the corresponding target deformation probability based on a matching vector.

The second vector database may include a plurality of reference vectors and reference deformation probabilities corresponding to the reference vectors. The reference vectors may be constructed based on at least one transportation parameter, pipeline information, and environmental information of the current segment, and the historical pipeline leakage information. The reference deformation probabilities corresponding to the reference vectors may include an actual deformation probability corresponding to the at least one transportation parameter, the pipeline information, the environmental information of the current segment, and the historical pipeline leakage information.

In some embodiments, the deformation assessment adjustment module 270 may construct a vector to be matched based on inlet data (e.g., a gas transportation temperature, and a gas transportation rate), the pipeline information, and the environmental information of the current segment, and calculate distances between the to be matched and the plurality of reference vectors, respectively, and determine a reference vector whose distance to the vector to be matched is less than a distance threshold as a target vector, and determine a reference deformation probability corresponding to the target vector as a current target deformation probability. The distance threshold may be set manually in advance based on past experience.

In some embodiments, the reference deformation probability may be labeled based on the historical pipeline leakage information. For example, if the current segment has leakages for multiple times (e.g., more than 5 times), the reference deformation probability is 1, if a count of leakages is in moderate (e.g., no more than 3), the reference deformation probability is 0.5, and if it no leakage occurs, the reference deformation probability is 0.

In some embodiments, the deformation assessment adjustment module 270 may determine a first magnification coefficient corresponding to each of the plurality of pipeline segments based on the first confidence level of each of the plurality of pipeline segments; and adjust the deformation assessment of each of the plurality of pipeline segments based on the first magnification coefficient.

The first magnification coefficient refers to a coefficient for adjusting the deformation assessment. The first magnification coefficient corresponding to each of the plurality of pipeline segments may be the same or different. In some embodiments, the first magnification coefficient corresponding to each of the plurality of pipeline segments may be negatively correlated with the first confidence level of each of the plurality of pipeline segments. For example, the smaller the first confidence level, the larger the corresponding first magnification coefficient.

In some embodiments, the deformation assessment adjustment module 270 may calculate an adjusted deformation assessment of each of the plurality of pipeline segments based on the first magnification coefficient corresponding to each of the plurality of pipeline segments to adjust the deformation assessment of each of the plurality of pipeline segments. For example, the adjusted deformation assessment=the current deformation assessment×the corresponding first magnification coefficient.

Figure 8:
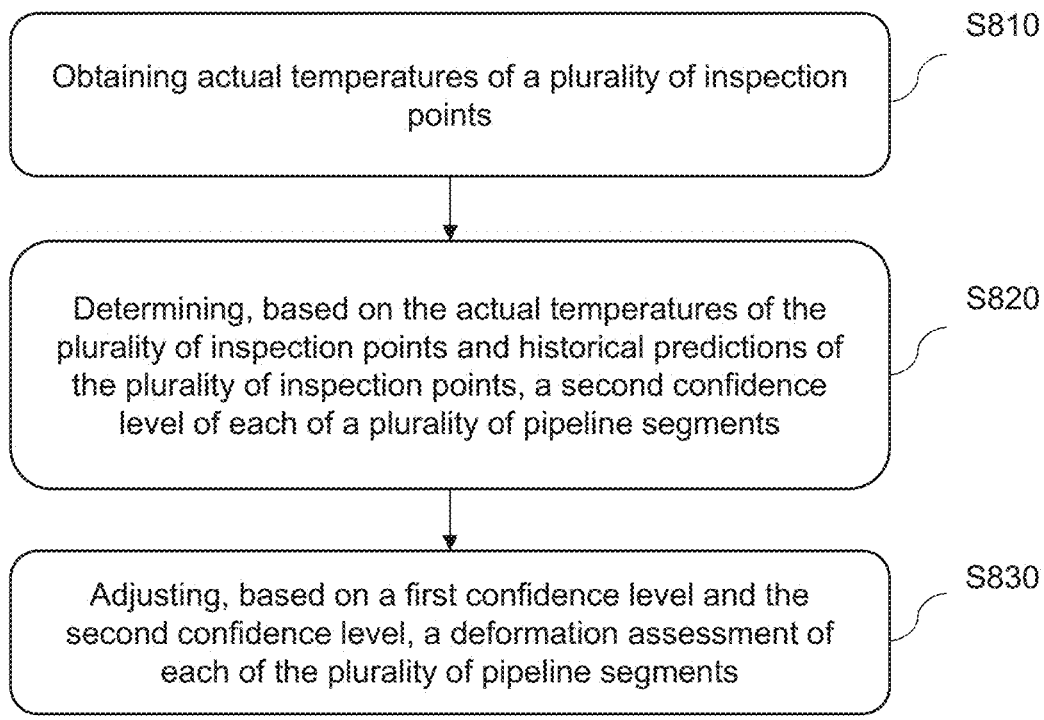
FIG. 8 is a flowchart illustrating an exemplary process of adjusting a deformation assessment of each of a plurality of pipeline segments according to some embodiments of the present disclosure.

More descriptions regarding adjusting the deformation assessment of each of the plurality of pipeline segments may be found in FIG. 8 and the related descriptions thereof.

According to some embodiments of the present disclosure, by determining the first confidence level of each of the plurality of pipeline segments and adjusting the deformation assessment of each of the plurality of pipeline segments based on the deformation assessment output from the second model, a more accurate deformation probability is obtained.

In some embodiments, a plurality of inspection points may be provided in the gas pipeline.

The inspection points are position points disposed on the gas pipeline for performing temperature inspection.

In some embodiments, a count of the inspection points may be a fixed value. In some embodiments, positions of the inspection points may be randomly generated. It should be noted that the count and the positions of the inspection points may be determined in any other feasible manner. More descriptions regarding determining the count and the positions of the inspection points may be found in FIG. 10 and the related descriptions thereof.

In some embodiments, the deformation assessment adjustment module 270 may adjust the deformation assessment of each of the plurality of pipeline segments based on the first confidence level of each of the plurality of pipeline segments through the operations described in the process 800.

FIG. 8 is a flowchart illustrating an exemplary process of adjusting a deformation assessment of each of a plurality of pipeline segments according to some embodiments of the present disclosure. As shown in FIG. 8, a process 800 may include the following operations. In some embodiments, the process 800 may be performed by the deformation assessment adjustment module 270.

In S810, actual temperatures of a plurality of inspection points may be obtained.

In some embodiments, the deformation assessment adjustment module 270 may obtain the actual temperatures of a plurality of inspection points through sensor devices. For example, a manager may provide a plurality of temperature sensors at the plurality of inspection points, and each of the temperature sensors may acquire the actual temperature of each inspection point in real time and upload the actual temperature of each inspection point to the deformation assessment adjustment module 270. In some embodiments, the temperature sensors may be integrated within a mobile measurement instrument, and the deformation assessment adjustment module 270 may acquire the actual temperatures of the plurality of inspection points by controlling the mobile measurement instrument to move to each of the inspection points in turn.

In S820, a second confidence level of each of a plurality of pipeline segments may be determined based on the actual temperatures of the plurality of inspection points and historical predictions of the plurality of inspection points.

The historical prediction refers to a prediction value of a temperature effect corresponding to a transportation parameter reported by the transportation station prior to determination of a current transportation scheme, i.e., a temperature effect output by a first model corresponding to the transportation parameter when the deformation assessment satisfies a preset condition.

More descriptions regarding the temperature effect output by the first model may be found in see FIG. 5 and the related descriptions thereof.

The second confidence level is another index configured to assess the adjustment magnitude or the adjustment range of the deformation assessment. In some embodiments, the second confidence level of each of the plurality of pipeline segments may be expressed based on a temperature difference of the inspection points on each of the plurality of pipeline segments.

In some embodiments, the deformation assessment adjustment module 270 may determine the second confidence level (i.e., the temperature difference of the inspection points on each of the plurality of pipeline segments) of each of the plurality of pipeline segments based on the actual temperatures of the plurality of inspection points and the historical predictions.

S821: a pipeline segment where each of the inspection points is located and a position of the inspection point on the corresponding pipeline segment.

The position of each inspection point on the corresponding pipeline segment may be expressed as a distance of each inspection point from an inlet or an outlet of the pipeline segment where the inspection point is located. In some embodiments, the pipeline segment where each inspection point is located and the position of the inspection point on the corresponding pipeline segment may be obtained by manager input.

S822: an inlet temperature of the pipeline segment where each of the inspection point is located and an outlet temperature (hereinafter referred to as a prediction outlet temperature) of the corresponding pipeline segment output by the first model may be obtained, and a prediction temperature of each of the inspection points may be determined by linear difference fitting. The inlet temperature of the pipeline segment where each of the inspection points is located is an outlet temperature of a previous pipeline segment of the corresponding pipeline segment, which may be obtained from the first model.

S823: a temperature difference of each of the inspection points may be obtained by calculation based on an actual temperature and the prediction temperature of each of the inspection points, so as to obtain the second confidence level of each of the plurality of pipeline segments. Exemplary equations for the calculation may include the temperature difference=|actual temperature−prediction temperature|.

It should be noted that for a pipeline segment that does not have inspection points, the second confidence level of the pipeline segment may be obtained based on a closest inspection point. For example, the second confidence level of the pipeline segment having no inspection point=a temperature difference of the closest inspection point÷a distance of the inspection point from the inlet or outlet of the pipeline segment.

In S830, the deformation assessment of each of the plurality of pipeline segments may be adjusted based on a first confidence level and the second confidence level.

In some embodiments, the deformation assessment adjustment module 270 may determine, based on the first confidence level and the second confidence level, a second magnification coefficient corresponding to each of the plurality of pipeline segments; and adjust, based on the second magnification coefficient, the deformation assessment of each of the plurality of pipeline segments.

In some embodiments, the second magnification coefficient corresponding to each of the plurality of pipeline segments may be negatively correlated with a weighted sum of the first confidence level and the second confidence level of each of the plurality of pipeline segments. For example, the smaller the weighted sum of the first confidence level and the second confidence level, the larger the corresponding second magnification coefficient.

The weighted sum of the first confidence level and the second confidence level is a value obtained by weighted summation of the first confidence level and the second confidence level. Since the second confidence level is correlated with the actual temperatures of the inspection points on the pipeline segments, the second confidence level is more reliable compared to the first confidence level, and thus a weight coefficient of the second confidence level is greater than a weight coefficient of the first confidence level during the weighted summation.

The first confidence level and the second confidence level need to be normalized for ease of calculation.

In some embodiments, the deformation assessment adjustment module 270 may calculate an adjusted deformation assessment of each of the plurality of pipeline segments based on the second magnification coefficient corresponding to each of the plurality of pipeline segments to adjust the deformation assessment of each of the plurality of pipeline segments. For example, the adjusted deformation assessment=the current deformation assessment×the corresponding second magnification coefficient.

According to some embodiments of the present disclosure, the second confidence level of each of the plurality of pipeline segments is determined based on the actual temperatures of the plurality of inspection points and the historical predictions, and the magnification coefficient is determined based on the weighted sum of the first confidence level and the second confidence level to adjust the deformation assessment of each of the plurality of pipeline segments assessment, thereby obtaining the more accurate deformation assessment.

FIG. 9 is a flowchart illustrating an exemplary process of updating at least one candidate parameter according to some embodiments of the present disclosure. As shown in FIG. 9, a process 900 may include the following operations. In some embodiments, the process 900 may be performed by the candidate parameter updating module 240.

In S910, a first amplitude of at least one candidate parameter may be determined based on a deformation assessment corresponding to the at least one candidate parameter.

The deformation assessment corresponding to the at least one candidate parameter refers to a deformation assessment of each of the plurality of pipeline segments corresponding to a certain candidate parameter used as a transportation parameter. In some embodiments, the deformation assessment corresponding to the at least one candidate parameter may be the same or different.

More descriptions regarding the at least one candidate parameter and the deformation assessments may be found in FIG. 4 and the related descriptions thereof.

In some embodiments, the candidate parameter updating module 240 may determine, through a second preset table, the deformation assessment corresponding to the at least one candidate parameter. The second preset table may be configured to characterize a correlation between the at least one candidate parameter and the deformation assessment of the pipeline segment. Each of the at least one candidate parameter has the corresponding deformation assessment for each of different pipeline segments. In some embodiments, the second preset table may be constructed based on historical candidate parameters and historical deformation assessments of each of the plurality of pipeline segments.

The first amplitude of the at least one candidate parameter is an adjustment magnitude of the at least one candidate parameter determined based on the deformation assessment corresponding to the at least one candidate parameter.

In some embodiments, the candidate parameter updating module 240 may determine the first amplitude of the at least one candidate parameter based on the deformation assessment corresponding to the at least one candidate parameter by a positive correlation principle. For example, the greater the deformation assessment corresponding to the at least one candidate parameter, the greater the first amplitude of the corresponding candidate parameter.

In S920, a second amplitude of the at least one candidate parameter may be determined based on a consistency of the deformation assessment and a gas flow direction.

The gas flow direction is a flow direction of the gas in the gas pipeline. For example, the gas flow direction is from a starting point (e.g., a gas source) to an end point (e.g., a user terminal).

The consistency of the deformation assessment and the gas flow direction is, for the same candidate parameter, a degree of consistency between a degree of deformation of the pipeline segment induced by the same candidate parameter and a distribution of the degree of deformation along the gas flow direction. For example, if a change in the candidate parameter causes the same or similar degree of deformation in a plurality of pipeline segments on the gas pipeline, and the pipeline segments are physically close to each other or contiguous, it indicates that the consistency of the deformation assessment corresponding to the candidate parameter and the gas flow direction is high.

In some embodiments, the candidate parameter updating module 240 may determine the consistency of the deformation assessment and the gas flow direction based on the deformation assessment corresponding to the at least one candidate parameter and the gas flow direction through graphical analysis by the following operations.

S921, a 2D coordinate system may be established.

Where an X-axis denotes numbering of the pipeline segments according to the gas flow direction, and a Y-axis denotes deformation assessment values corresponding to the pipeline segments. Each of the pipeline segments has a corresponding point in the two-dimensional coordinate system.

S922, a deformation curve may be plotted.

The deformation assessment values of all the pipeline segments corresponding to the at least one candidate parameter may be plotted in a two-dimensional coordinate system and sequentially connected to form a curve. The curve reflects a distribution of the degree of deformation of each of the plurality of pipeline segments along the gas flow direction for the same candidate parameter.

S923, a peak condition may be analyzed.

When there is only one peak in the curve, and the pipeline segments corresponding to the peak are adjacent (e.g., a pipeline segment 2, a pipeline segment 3, and a pipeline segment 4), and the deformation assessment values are all at or close to a maximum value of the curve for the pipeline segment, it indicates that the consistency of the deformation assessment and the gas flow direction is high for the candidate parameter. In this case, the deformation is mainly concentrated in these adjacent pipeline segments, at this time, a pipeline deformation problem can be solved by reducing the gas transportation temperature.

On the contrary, if the curve shows a plurality of peaks (e.g., three peaks) and the pipeline segments corresponding to the peaks are far apart on the X-axis (e.g., a pipeline segment 1, a pipeline segment 50, and a pipeline segment 100), it indicates that the consistency of the deformation assessment and the gas flow direction is poor for the candidate parameter. In this case, a count of uncontrollable factors that cause deformation of the pipeline increases, and at this time, it needs to increase a reduction magnitude of the candidate parameter to finally achieve the effect of reducing the deformation at a plurality of positions.

In some embodiments, the candidate parameter updating module 240 may select a plurality of pipeline segments with top-ranked (e.g., top 10) deformation assessment values based on the deformation assessment corresponding to the at least one candidate parameter and the gas flow direction, and determine the consistency of the deformation assessment and the gas flow direction by comparing a relative positional relationship (e.g., a distance) between the pipeline segments. For example, if a total distance between the plurality of pipeline segments with the top-ranked deformation assessment values (e.g., top 10) does not exceed a distance threshold, the consistency between the deformation assessment and the gas flow direction is high. The distance threshold may be set manually in advance.

The second amplitude is an adjustment magnitude based on the consistency of the gas flow direction and the deformation assessment corresponding to the at least one candidate parameter.

In some embodiments, the candidate parameter updating module 240 may determine the second amplitude of the at least one candidate parameter based on the consistency of the deformation assessment and the gas flow direction by a negative correlation principle. For example, the higher the consistency of the deformation assessment and the gas flow direction, the smaller the second amplitude of the at least one candidate parameter.

When analyzing the effect of a candidate parameter on the pipeline deformation, if it is found that a deformation assessment result shows a high consistency in the pipeline segments along the gas flow direction, it indicates that the effect of the candidate parameter on the pipeline deformation is localized and concentrated. In this case, a small adjustment to the candidate parameter is required to control or reduce the deformation. On the contrary, if the deformation assessment result shows a low consistency, it indicates that the effect of the candidate parameter on the pipeline deformation is likely to be more complex and diffuse. In this case, the second amplitude needs to be scaled up to ensure that a plurality of deformation points are effectively controlled.

In S930, the at least one candidate parameter may be updated, based on the first amplitude and the second amplitude.

In some embodiments, the candidate parameter updating module 240 may calculate a maximum or mean value of the first amplitude and the second amplitude and use the maximum or mean value as a final adjustment magnitude (e.g., a temperature reduction magnitude), and then adjust or update a current candidate parameter based on the final adjustment magnitude. Merely by way of example, the updated candidate parameter=the current candidate parameter−|the final adjustment magnitude|.

In some embodiments of the present disclosure, by determining the first amplitude and the second amplitude of the candidate parameter, the candidate parameter updating module considers the effect of the change in the candidate parameter on the pipeline deformation, and the consistency of the change and the gas flow direction, which makes the adjustment more precise and can more accurately reflect the actual situation, thereby reducing unnecessary adjustment errors.

In some embodiments, the gas pipeline may be provided with a plurality of inspection points, the plurality of inspection points corresponding to at least one transportation station.

The transportation station refers to a station in the gas pipeline that is responsible for a variety of functions such as gas transmission, pressurization, distribution, metering, monitoring, etc.

In some embodiments, one or more transportation stations may be provided on the gas pipeline. One transportation station may correspond to one or more inspection points. More descriptions regarding the transportation station may be found in the present disclosure above (e.g., FIG. 3).

In some embodiments, a count of the inspection points may be correlated with the deformation assessment output by the second model. By statistically analyzing the deformation assessment result output by the second model, the government safety supervision management platform may quantify and identify pipeline segments that exceed a preset safety threshold in terms of the degree of deformation. In some embodiments, there is a significant positive correlation between the count of the inspection points and a count of the pipeline segments exceeding the safety threshold. That is, the greater the count of the pipeline segments exceeding the safety threshold, the greater the count of the inspection points.

More descriptions regarding the second model and the deformation assessment may be found in the present disclosure above (e.g., FIG. 4 and FIG. 6).

According to some embodiments of the present disclosure, the deformation assessment of the gas pipeline is determined based on the second model, which can identify possible weaknesses or high-risk pipeline segments in the gas pipeline. The system can, based on the of the assessment results, dynamically adjust the count of inspection points by increasing the count of the inspection points in the pipeline segments that have high deformation or high risk, and appropriately decreasing the count of the inspection points in the pipeline segments that are relatively stable, which ensures close monitoring of critical pipeline segments, effectively avoids waste of resources, and improves the relevance and effectiveness of monitoring.

In some embodiments, the count of inspection points may be correlated with the temperature effect of the gas pipeline. In some embodiments, there is a significant positive correlation between the count of the inspection points and the temperature effect value. That is, the greater the temperature effect, the greater the count of inspection points.

According to some embodiments of the present disclosure, by combining the count of the inspection points with the temperature effect of the gas pipeline, the monitoring system can more accurately capture the change in the gas pipeline under different temperature conditions. Adding the inspection points in regions with large temperature fluctuations allows for more frequent monitoring of the temperature effect on pipeline materials, stress states, and other aspects of the pipeline, thus allowing for earlier detection of potential safety hazards.

In some embodiments, the count of the inspection points may be correlated with the count of the pipeline segments. In some embodiments, the greater the count of gas pipeline segments, the greater the count of inspection points that should be provided to ensure accuracy and comprehensiveness of the inspection.

According to some embodiments of the present disclosure, by dividing the gas pipeline into a plurality of pipeline segments and determining the distribution of the inspection points according to the count of pipeline segments, it ensures that each of the plurality of pipeline segments can be adequately monitored, which detects possible problems within each segment in real time, such as leakages, deformations, or the like, such that targeted measures can be taken to deal with the problems and prevent the problems from worsening.

In some embodiments, the positions of the inspection points may be correlated with the temperature effect of the gas pipeline. In some embodiments, the positions of the inspection points need to cover at least the pipeline segments with high temperature effect values. For example, in order to determine the optimal positions of the inspection points, the government safety supervision management platform may rank the pipeline segments based on the temperature effect with respect to temperature effect parameters $m11$, $m12, \ldots, m21$, etc. The pipeline segments with the highest temperature effect (e.g., top 5%) among the pipeline segments may be selected and the inspection points may be provided on the pipeline segments, or, if it is not feasible to provide the inspection points directly on the pipeline segments, closest inspection point positions to the pipeline segments may be selected to ensure that the minimum count of inspection points can cover and effectively monitor the pipeline segments with the most significant temperature effect.

According to some embodiments of the present disclosure, the temperature effect on the performance of the pipeline can be captured more accurately by setting the positions of the inspection points in regions that are more affected by temperature, such as a position with a large gradient of temperature change, a pipeline joint, an elbow, or the like, which helps to detect potential problems such as pipeline deformation and leakage due to the temperature change in time, and improves the accuracy of monitoring.

More descriptions regarding the inspection points may be found in the present disclosure above (e.g., FIG. 8).

FIG. 10 is a flowchart illustrating an exemplary process of adjusting at least one transportation parameter according to some embodiments of the present disclosure. As shown in FIG. 10, a process 1000 may include the following operations. In some embodiments, the process 1000 may be performed by the transportation parameter adjustment module 280.

In S1010, actual temperatures of a plurality of inspection points may be obtained.

More descriptions regarding obtaining the actual temperatures of the plurality of inspection points may be found in FIG. 8 and the related descriptions thereof.

In S1020, a confidence level of at least one transportation station corresponding to the plurality of inspection points may be determined based on the actual temperatures of the plurality of inspection points and historical predictions of the plurality of inspection points.

The confidence level of the at least one transportation station may be configured to assess an adjustment magnitude or an adjustment range of the at least one transportation parameter of the at least one transportation station. In some embodiments, the confidence level of the transportation station may be represented by a vector composed of temperature differences of one or more inspection points corresponding to the at least one transportation station.

As described above, one transportation station may control one or more pipeline segments, such that when the transportation station controls only one pipeline segment, the confidence level of the transportation station is the same as the second confidence level of the pipeline segment controlled by the transportation station.

More descriptions regarding the actual temperatures of the plurality of inspection points and the historical predictions, and the calculation of the temperature differences of the plurality of inspection points may be found in FIG. 8 and the related descriptions thereof.

In S1030, at least one transportation parameter may be adjusted based on a confidence level of the at least one transportation station.

More descriptions regarding the at least one transportation parameters may be be found in the present disclosure above (e.g. FIGS. 3-4).

In some embodiments, the transportation parameter adjustment module 280 may determine, based on the confidence level of the at least one transportation station, a plurality of inspection points whose temperature differences are within a temperature range and corresponding transportation stations among the confidence level, and adjust the transportation parameters (e.g., the gas transportation temperature) of the transportation stations corresponding to the plurality of inspection points in the following manner. Merely by way of example, an adjusted gas transportation temperature=a current gas transportation temperature+the temperature difference*an adjustment coefficient, where the adjustment coefficient is less than 1.

In some embodiments, the temperature range and adjustment coefficient may be determined based on past experience, historical data, simulation experiments, or the like.

According to some embodiments of the present disclosure, by obtaining the actual temperatures of the plurality of inspection points in real time and comparing the actual temperatures with the historical predictions, the pipeline segments with temperature anomalies can be quickly determined. The system can immediately calculate the confidence level of the corresponding transportation station based on the anomaly information, and adjust the transportation parameter accordingly. Such rapid response mechanism helps to correct deviations in pipeline operation in time, preventing problems from worsening.

It should be noted that the foregoing descriptions of the process 800, the process 900, and the process 1000 are for the purpose of exemplification and illustration only, and do not limit the scope of application of the present disclosure. For those skilled in the art, various corrections and changes may be made to the process 800, the process 900, and the process 1000 under the guidance of the present disclosure. However, these corrections and changes remain within the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure and are within the spirit and scope of the exemplary embodiments of the present s disclosure.

What is claimed is:

1. A method for pipeline temperature control of smart gas based on an Internet of Things (IoT), implemented based on a system for pipeline temperature control of smart gas based on an Internet of Things (IoT), comprising:

obtaining, based on a gas company management platform, pipeline information of a gas pipeline and basic perceptual data, obtaining at least one candidate parameter, and determining at least one transportation parameter based on at least one iterative interaction with a government safety supervision management platform; wherein the at least one candidate parameter includes at least one of a candidate gas transportation temperature and a candidate gas transportation rate of each of at least one transportation station; and controlling, based on the at least one candidate parameter, a gas equipment object platform to adjust a gas transportation temperature; wherein the at least one iterative interaction includes:

the gas company management platform determining, based on the at least one candidate parameter, the pipeline information, and environmental information, a temperature effect of the gas pipeline through a first model, and sending the temperature effect of the gas pipeline to the government safety supervision management platform; temperature effect of the gas pipeline reflecting a temperature change in the gas pipeline, the first model being a machine learning model; wherein the gas pipeline includes a plurality of pipeline segments, the first model includes a plurality of temperature layers, each of the plurality of temperature layers corresponds to one of the plurality of pipeline segments, an input of each of the plurality of temperature layers includes inlet data of the corresponding pipeline segment, the pipeline information, and the environmental information, and an output of each of the plurality of temperature layers includes the temperature effect and outlet data of the corresponding pipeline segment; the inlet data includes at least one of an inlet temperature and an inlet rate, the inlet data of a first pipeline segment is the at least one candidate parameter; and the output data includes at least one of an outlet temperature and an outlet rate;

the government safety supervision management platform determining, based on the temperature effect of the gas pipeline, the at least one candidate parameter, the pipeline information, and the basic perceptual data, a deformation assessment of the gas pipeline;

obtaining at least one updated candidate parameter by updating, based on the deformation assessment of the gas pipeline, the at least one candidate parameter; and in response to determining that the deformation assessment of the gas pipeline satisfies a preset deformation condition, determining the at least one updated candidate parameter as the at least one transportation parameter.

2. The method of claim 1, wherein division points of the plurality of pipeline segments include a pipeline diameter change section, a pipeline bifurcation position, and a pipeline intersection position of the gas pipeline;
the method further comprises:
determining an inlet rate of a current segment based on an outlet rate and a pipeline diameter of a previous segment.

3. The method of claim 1, wherein the updating, based on the deformation assessment of the gas pipeline, the at least one candidate parameter includes:
determining, based on a deformation assessment corresponding to the at least one candidate parameter, a first amplitude of the at least one candidate parameter;
determining, based on a consistency of the deformation assessment and a gas flow direction, a second amplitude of the at least one candidate parameter; and
updating, based on the first amplitude and the second amplitude, the at least one candidate parameter.

4. The method of claim 1, wherein the gas pipeline is provided with a plurality of inspection points, the plurality of inspection points corresponding to at least one transportation station;
the method further comprises:
obtaining actual temperatures of the plurality of inspection points;
determining, based on the actual temperatures of the plurality of inspection points and historical predictions of the plurality of inspection points, a confidence level of the at least one transportation station corresponding to the plurality of inspection points; and
adjusting the at least one transportation parameter based on the confidence level of the at least one transportation station.

5. The method of claim 1, wherein a count of the plurality of inspection points is correlated with the temperature effect of the gas pipeline.

6. A system for pipeline temperature control of smart gas based on an Internet of Things (IoT), comprising a management platform, a sensor network platform, and a gas equipment object platform respectively configured on different servers; wherein
the management platform includes a gas company management platform and a government safety supervision management platform;
the gas company management platform is configured to:
obtain pipeline information of a gas pipeline and basic perceptual data, obtain at least one candidate parameter, and determine at least one transportation parameter based on at least one iterative interaction with the government safety supervision management platform; wherein the at least one candidate parameter includes at least one of a candidate gas transportation temperature and a candidate gas transportation rate of each of at least one transportation station; and
control, based on the at least one transportation parameter, the gas equipment object platform to adjust a gas transportation temperature; wherein
the at least one iterative interaction includes:
determining, based on the at least one candidate parameter, the pipeline information, and environmental information, a temperature effect of the gas pipeline through a first model; and sending the temperature effect of the gas pipeline to the government safety supervision management platform; temperature effect of the gas pipeline reflecting a temperature change in the gas pipeline, the first model being a machine learning model; wherein
the gas pipeline includes a plurality of pipeline segments, the first model includes a plurality of temperature layers, each of the plurality of temperature layers corresponds to one of the plurality of pipeline segments, an input of each of the plurality of temperature layers includes inlet data of the corresponding pipeline segment, the pipeline information, and the environmental information, and an output of each of the plurality of temperature layers includes the temperature effect and outlet data of the corresponding pipeline segment; the inlet data includes at least one of an inlet temperature and an inlet rate, the inlet data of a first pipeline segment is the at least one candidate parameter; and the output data includes at least one of an outlet temperature and an outlet rate;
the government safety supervision management platform is configured to:
determine, based on the temperature effect of the gas pipeline, the at least one candidate parameter, the pipeline information, and the basic perceptual data, a deformation assessment of the gas pipeline;
obtain at least one updated candidate parameter by updating, based on the deformation assessment of the gas pipeline, the at least one candidate parameter; and
in response to determining that the deformation assessment of the gas pipeline satisfies a preset deformation condition, determine the at least one updated candidate parameter as the at least one transportation parameter.

7. The system of claim 6, wherein the management platform is provided with:
a parameter acquisition module configured to obtain the basic perceptual data, the at least one candidate parameter, and the pipeline information;
a temperature effect determination module configured to determine, based on the at least one candidate parameter, the pipeline information, and the environmental information, the temperature effect of the gas pipeline through a first model;
a deformation assessment determination module configured to determine, based on the temperature effect of the gas pipeline, the at least one candidate parameter, the pipeline information, and the basic perceptual data, the deformation assessment of the gas pipeline;
a candidate parameter updating module configured to obtain at least one updated candidate parameter by updating, based on the deformation assessment of the gas pipeline, the at least one candidate parameter;
a transportation parameter determination module configured to determine, in response to determining that the deformation assessment of the gas pipeline satisfies a preset deformation condition, and the at least one updated candidate parameter as the at least one transportation parameter; and
a transportation temperature adjustment module configured to control, based on the at least one transportation parameter, an air compression device of the gas equipment object platform to adjust the gas transportation temperature.

8. The system of claim 7, wherein the gas pipeline includes the plurality of pipeline segments, the government safety supervision management platform is further provided with:

a deformation assessment adjustment module configured to:

for each of the plurality of pipeline segments, determine, based on the pipeline information, the environmental information, the at least one transportation parameter, inlet data of each the plurality of pipeline segments, and historical pipeline leakage information, a first confidence level of the pipeline segment; and adjust, based on the first confidence level of the pipeline segment, the deformation assessment of the pipeline segment.

9. The system of claim 7, wherein the gas pipeline is provided with a plurality of inspection points, the plurality of inspection points corresponding to at least one transportation station;

the government safety supervision management platform is further provided with:

a transportation parameter adjustment module configured to:

obtain actual temperatures of the plurality of inspection points;

determine, based on the actual temperatures of the plurality of inspection points and historical predictions of the plurality of inspection points, a confidence level of the at least one transportation station corresponding to the plurality of inspection points; and adjust the at least one transportation parameter based on the confidence level of the at least one transportation station.

* * * * *